US011314299B2

(12) United States Patent
Leung et al.

(10) Patent No.: US 11,314,299 B2
(45) Date of Patent: Apr. 26, 2022

(54) SYSTEM, APPARATUS AND METHOD FOR DYNAMIC POWER STATE SCALING OF A VOLTAGE REGULATOR FOR A PROCESSOR

(71) Applicant: Intel Corporation, Santa Clara, CA (US)

(72) Inventors: Patrick Kam-Shing Leung, Portland, OR (US); Ashraf H. Wadaa, Beaverton, OR (US); Trevor S. Love, Wilsonville, OR (US); Vasudev Bibikar, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/832,012

(22) Filed: Mar. 27, 2020

(65) Prior Publication Data
US 2021/0303045 A1 Sep. 30, 2021

(51) Int. Cl.
G06F 1/26 (2006.01)
(52) U.S. Cl.
CPC .................................... G06F 1/26 (2013.01)
(58) Field of Classification Search
CPC ........................................................ G06F 1/26
USPC ........................................................ 713/300
See application file for complete search history.

(56) References Cited

U.S. PATENT DOCUMENTS

| 8,937,497 B1* | 1/2015 | Tobin ........................ G06F 1/26 327/56 |
| 2007/0145962 A1* | 6/2007 | Huang ................... G06F 1/3203 323/283 |
| 2012/0054515 A1* | 3/2012 | Naffziger .............. G06F 1/3296 713/320 |
| 2014/0068627 A1* | 3/2014 | Goh ........................ G06F 1/329 718/105 |
| 2014/0173306 A1* | 6/2014 | Cooper ................. G06F 1/3268 713/320 |
| 2016/0239065 A1* | 8/2016 | Lee ........................ G06F 9/5094 |
| 2018/0314308 A1* | 11/2018 | Savidis ................... G06F 1/329 |
| 2019/0129498 A1 | 5/2019 | Leung et al. |
| 2020/0026345 A1* | 1/2020 | Fletcher .................... G06F 1/26 |
| 2021/0034084 A1* | 2/2021 | Zou ........................... G05F 1/56 |

OTHER PUBLICATIONS

U.S. Appl. No. 16/554,940, filed Aug. 29, 2019, entitled "System, Apparatus and Method for Providing Hardware State Feedback to An Operating System In a Heterogeneous Processor," by Praveen Kumar Gupta, 86 pages total.

* cited by examiner

Primary Examiner — Robert A Cassity
(74) Attorney, Agent, or Firm — Trop, Pruner & Hu, P.C.

(57) ABSTRACT

In one embodiment, a processor includes: at least one core to execute a workload; a voltage regulator to provide an operating voltage to the at least one core; and a power controller coupled to the voltage regulator. The power controller may control the voltage regulator to provide the operating voltage, and may have a voltage regulator control circuit to select one of a plurality of power state profiles based at least in part on a classification of the workload, and to cause an update to a power state of the voltage regulator according to the selected power state profile. Other embodiments are described and claimed.

17 Claims, 21 Drawing Sheets

US 11,314,299 B2

SYSTEM, APPARATUS AND METHOD FOR DYNAMIC POWER STATE SCALING OF A VOLTAGE REGULATOR FOR A PROCESSOR

TECHNICAL FIELD

Embodiments relate to controlling a voltage regulator for a processor.

BACKGROUND

Advances in semiconductor processing and logic design have permitted an increase in the amount of logic that may be present on integrated circuit devices. As a result, computer system configurations have evolved from a single or multiple integrated circuits in a system to multiple hardware threads, multiple cores, multiple devices, and/or complete systems on individual integrated circuits. Additionally, as the density of integrated circuits has grown, the power requirements for computing systems (from embedded systems to servers) have also escalated. Furthermore, software inefficiencies, and its requirements of hardware, have also caused an increase in computing device energy consumption. In fact, some studies indicate that computing devices consume a sizeable percentage of the entire electricity supply for a country, such as the United States of America. As a result, there is a vital need for energy efficiency and conservation associated with integrated circuits. These needs will increase as servers, desktop computers, notebooks, Ultrabooks™, tablets, mobile phones, processors, embedded systems, etc. become even more prevalent (from inclusion in the typical computer, automobiles, and televisions to biotechnology).

Today, power delivery (PD) losses contribute up to 20% of total system power in various scenarios, e.g., including video playback. Power delivery optimization is gaining importance in improving overall battery life in many different types of platforms.

DETAILED DESCRIPTION

Figure 1:
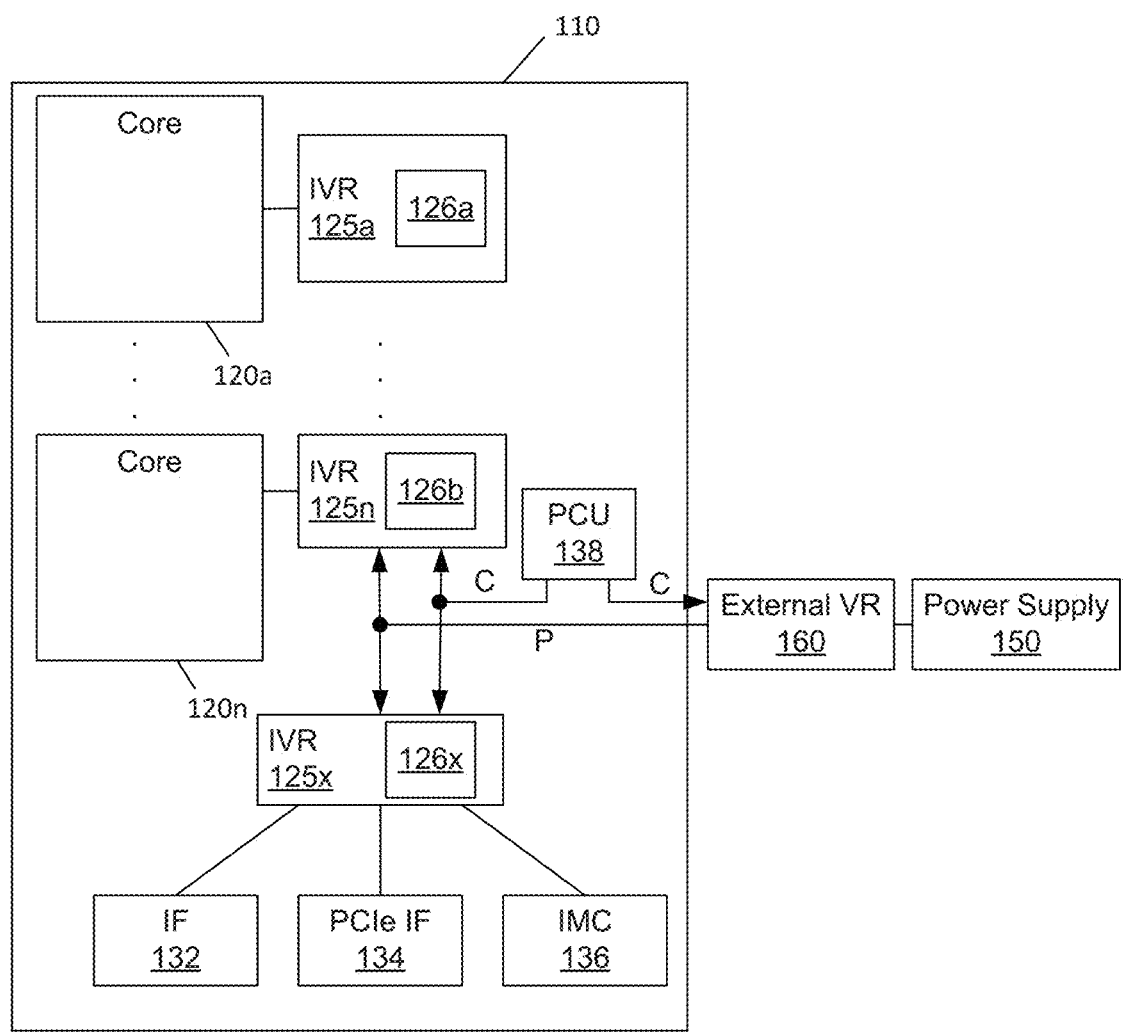
FIG. 1 is a block diagram of a portion of a system in accordance with an embodiment of the present invention.

In various embodiments, a computing platform may include one or more processors, which in turn may include one or more processing cores and/or one or more other processing units. Such processors may be powered by integrated voltage regulators and/or other voltage regulators of the platform. Embodiments provide dynamic control of configuration of one or more voltage regulators to enable improved power delivery efficiency. To this end, a platform may be configured with multiple power state profiles associated with one or more of its voltage regulators. Then during normal system operation, dynamic reconfiguration of one or more voltage regulators may occur using a power state profile that is dynamically selected. As will be described herein, this dynamic selection may be based at least in part on a workload classification for a currently executing workload on the processor. In addition various environmental conditions, including whether the platform is actively being powered by an AC or DC source, among other such information, may be used to select the appropriate power state profile. Still further, user preference information regarding user preference between performance and power consumption may be used in selecting an appropriate power state profile.

Understand that the power state profiles themselves may be dynamically updated during system operation in the field. For example, different users may have different patterns of workload execution. As such, using, e.g., a machine learning environment, multiple power state profiles can be dynamically determined based on runtime analysis of workloads that are executed using different power state profiles to thus optimize settings of such power state profiles based on detected workload conditions. In this way, embodiments may leverage machine learning to dynamically optimize voltage regulator losses by selecting an appropriate power state profile based at least in part on workload classification and runtime prediction. Embodiments may thus reduce platform power consumption and extend battery life. With multiple power state profiles, a system designer can define safe values of cutoff thresholds that is within an operating range of the voltage regulator. In contrast, allowing random programming of any given cutoff threshold may make a system prone to malicious attack.

To better understand embodiments herein, it is instructive to consider a representative voltage regulator. As discussed above, embodiments may be used in connection with integrated voltage regulators such as may be included within a single semiconductor die along with cores and other circuitry of a multicore processor. Understand that a given processor may include multiple such integrated voltage regulators, e.g., each associated with a different power domain, such as one or more core power domains or graphics power domain, among others. In any event, these integrated voltage regulators may include multiple phase counts, regulation topologies and so forth. Depending upon current consumption levels, an appropriate power state or voltage regulator configuration may be selected. In turn, the voltage regulators may include configuration circuitry to cause dynamic reconfigurations to their power states.

Referring now to Table 1 below, shown is an example listing of power states available for a particular voltage regulator. As shown, there may be at least five power states, where each power state is for a given voltage regulator configuration and is associated with a cutoff threshold. Collectively, these power states and corresponding cutoff thresholds form a single power state profile. Specifically, a given power state is used until current consumption is at level that meets a cutoff threshold level. Then a higher power state (having a lower number, e.g., PS0 is a higher power state than PS1) can be selected. As further shown in Table 1, each power state corresponds to a given configuration mode of operation of the voltage regulator such as a single phase or multiphase mode, a discontinuous conduction mode (DCM) or a continuous conduction mode (CCM). Of course additional configuration parameters may be associated with each power state. And understand that a given voltage regulator may have more or fewer power states available.

TABLE 1

| Power State | Cutoff Current Entry Criteria (Default) | Voltage Regulator Operation |
| --- | --- | --- |
| PS0 | >20 A | Multi-phase |
| PS1 | <20 A | 1-phase, CCM |
| PS2 | <5 A | 1-phase, DCM |
| PS3 | <1 A | 1-phase, DCM (e.g., ADC off) |
| PS4 | 0 V/0 A | Mostly off. <1 mW consumption |

As will be described further herein, in embodiments a power controller of a processor may be configured to detect current consumption levels (among possibly other operating conditions) and dynamically select an appropriate power state for one or more voltage regulators. In turn based on this selection, the power controller may send an appropriate command to the voltage regulator to cause it to dynamically reconfigure from one power state configuration to another.

Although the following embodiments are described with reference to energy conservation and energy efficiency in specific integrated circuits, such as in computing platforms or processors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to any particular type of computer systems. That is, disclosed embodiments can be used in many different system types, ranging from server computers (e.g., tower, rack, blade, micro-server and so forth), communications systems, storage systems, desktop computers of any configuration, laptop, notebook, and tablet computers (including 2:1 tablets, phablets and so forth), and may be also used in other devices, such as handheld devices, systems on chip (SoCs), and embedded applications. Some examples of handheld devices include cellular phones such as smartphones, Internet protocol devices, digital cameras, personal digital assistants (PDAs), and handheld PCs. Embedded applications may typically include a microcontroller, a digital signal processor (DSP), network computers (NetPC), set-top boxes, network hubs, wide area network (WAN) switches, wearable devices, or any other system that can perform the functions and operations taught below. More so, embodiments may be implemented in mobile terminals having standard voice functionality such as mobile phones, smartphones and phablets, and/or in non-mobile terminals without a standard wireless voice function communication capability, such as many wearables, tablets, notebooks, desktops, micro-servers, servers and so forth. Moreover, the apparatuses, methods, and systems described herein are not limited to physical computing devices, but may also relate to software optimizations for energy conservation and efficiency. As will become readily apparent in the description below, the embodiments of methods, apparatuses, and systems described herein (whether in reference to hardware, firmware, software, or a combination thereof) are vital to a 'green technology' future, such as for power conservation and energy efficiency in products that encompass a large portion of the US economy.

Referring now to FIG. 1, shown is a block diagram of a portion of a system in accordance with an embodiment of the present invention. As shown in FIG. 1, system 100 may include various components, including a processor 110 which as shown is a multicore processor. Processor 110 may be coupled to a power supply 150 via an external voltage regulator 160, which may perform a first voltage conversion to provide a primary regulated voltage to processor 110.

As seen, processor 110 may be a single die processor including multiple cores $120_a$-$120_n$. In addition, each core may be associated with an integrated voltage regulator (IVR) $125_a$-$125_n$ which receives the primary regulated voltage and generates an operating voltage to be provided to one or more agents of the processor associated with the IVR. Accordingly, an IVR implementation may be provided to allow for fine-grained control of voltage and thus power and performance of each individual core. As such, each core can operate at an independent voltage and frequency, enabling great flexibility and affording wide opportunities for balancing power consumption with performance. In some embodiments, the use of multiple IVRs enables the grouping of components into separate power planes, such that power is regulated and supplied by the IVR to only those components in the group. During power management, a given power plane of one IVR may be powered down or off when the processor is placed into a certain low power state, while another power plane of another IVR remains active, or fully powered. In embodiments herein, each IVR 125 may include a corresponding configuration circuit 126, which as will be described herein, may be used to configure the corresponding IVR to operate at a given power state, where this power state may be selected based at least in part on a classified workload that is in execution on the corresponding domain.

Still referring to FIG. 1, additional components may be present within the processor including an input/output interface 132, another interface 134, and an integrated memory controller 136. As seen, each of these components may be powered by another integrated voltage regulator $125_x$. In one embodiment, interface 132 may be enable operation for an Intel®. Quick Path Interconnect (QPI) interconnect, which provides for point-to-point (PtP) links in a cache coherent protocol that includes multiple layers including a physical layer, a link layer and a protocol layer. In turn, interface 134 may communicate via a Peripheral Component Interconnect Express (PCIe™) protocol.

Also shown is a power control unit (PCU) 138, which may include hardware, software and/or firmware to perform power management operations with regard to processor 110. As seen, PCU 138 provides control information to external voltage regulator 160 via a digital interface to cause the voltage regulator to generate the appropriate regulated voltage. PCU 138 also provides control information to IVRs 125 via another digital interface to control the operating voltage generated (or to cause a corresponding IVR to be disabled in a low power mode) and further to communicate power state updates to IVRs 125.

To this end, PCU 138 may include control circuitry to determine an appropriate power state for each of IVRs 125 based at least in part on a workload in execution on the corresponding domain. In this way, improved voltage regulator efficiency may be realized, as described herein.

In various embodiments, PCU 138 may include a variety of power management logic units to perform hardware-based power management. Such power management may be wholly processor controlled (e.g., by various processor hardware, and which may be triggered by workload and/or power, thermal or other processor constraints) and/or the power management may be performed responsive to external sources (such as a platform or management power management source or system software).

Furthermore, while FIG. 1 shows an implementation in which PCU 138 is a separate processing engine (which may be implemented as a microcontroller), understand that in some cases in addition to or instead of a dedicated power controller, each core may include or be associated with a power control agent to more autonomously control power consumption independently. In some cases a hierarchical power management architecture may be provided, with PCU 138 in communication with corresponding power management agents associated with each of cores 120.

Also, understand while in the high level view of FIG. 1, the internal power controller of processor 110 is referred to as a "PCU," in other cases, this internal power controller may be referred to equally as a power management unit (PMU). Herein, the terms "PCU" and "PMU" may be used interchangeably to refer to hardware power control circuitry internal to a processor that may execute various sequences of instructions to perform power management activities on behalf of the processor and its constituent components.

While not shown for ease of illustration, understand that additional components may be present within processor 110 such as additional control circuitry, and other components such as internal memories, e.g., one or more levels of a cache memory hierarchy and so forth. Furthermore, while shown in the implementation of FIG. 1 with an integrated voltage regulator, embodiments are not so limited.

Note that the power management techniques described herein may be independent of and complementary to an operating system (OS)-based power management (OSPM) mechanism. According to one example OSPM technique, a processor can operate at various performance states or levels, so-called P-states, namely from P0 to PN. In general, the P1 performance state may correspond to the highest guaranteed performance state that can be requested by an OS. Embodiments described herein may enable dynamic changes to the guaranteed frequency of the P1 performance state, based on a variety of inputs and processor operating parameters. In addition to this P1 state, the OS can further request a higher performance state, namely a P0 state. This P0 state may thus be an opportunistic or turbo mode state in which, when power and/or thermal budget is available, processor hardware can configure the processor or at least portions thereof to operate at a higher than guaranteed frequency. In many implementations a processor can include multiple so-called bin frequencies above the P1 guaranteed maximum frequency, exceeding to a maximum peak frequency of the particular processor, as fused or otherwise written into the processor during manufacture. In addition, according to one OSPM mechanism, a processor can operate at various power states or levels. With regard to power states, an OSPM mechanism may specify different power consumption states, generally referred to as C-states, C0, C1 to Cn states. When a core is active, it runs at a C0 state, and when the core is idle it may be placed in a core low power state, also called a core non-zero C-state (e.g., C1-C6 states), with each C-state being at a lower power consumption level (such that C6 is a deeper low power state than C1, and so forth).

Understand that many different types of power management techniques may be used individually or in combination in different embodiments. As representative examples, a power controller may control the processor to be power managed by some form of dynamic voltage frequency scaling (DVFS) in which an operating voltage and/or operating frequency of one or more cores or other processor logic may be dynamically controlled to reduce power consumption in certain situations. In an example, DVFS may be performed using Enhanced Intel SpeedStep™ technology available from Intel Corporation, Santa Clara, Calif., to provide optimal performance at a lowest power consumption level. In another example, DVFS may be performed using Intel TurboBoost™ technology to enable one or more cores or other compute engines to operate at a higher than guaranteed operating frequency based on conditions (e.g., workload and availability).

Another power management technique that may be used in certain examples is dynamic swapping of workloads between different compute engines. For example, the processor may include asymmetric cores or other processing engines that operate at different power consumption levels, such that in a power constrained situation, one or more workloads can be dynamically switched to execute on a lower power core or other compute engine. Another exemplary power management technique is hardware duty cycling (HDC), which may cause cores and/or other compute engines to be periodically enabled and disabled according to a duty cycle, such that one or more cores may be made inactive during an inactive period of the duty cycle and made active during an active period of the duty cycle. Although described with these particular examples, understand that many other power management techniques may be used in particular embodiments.

Figure 2:
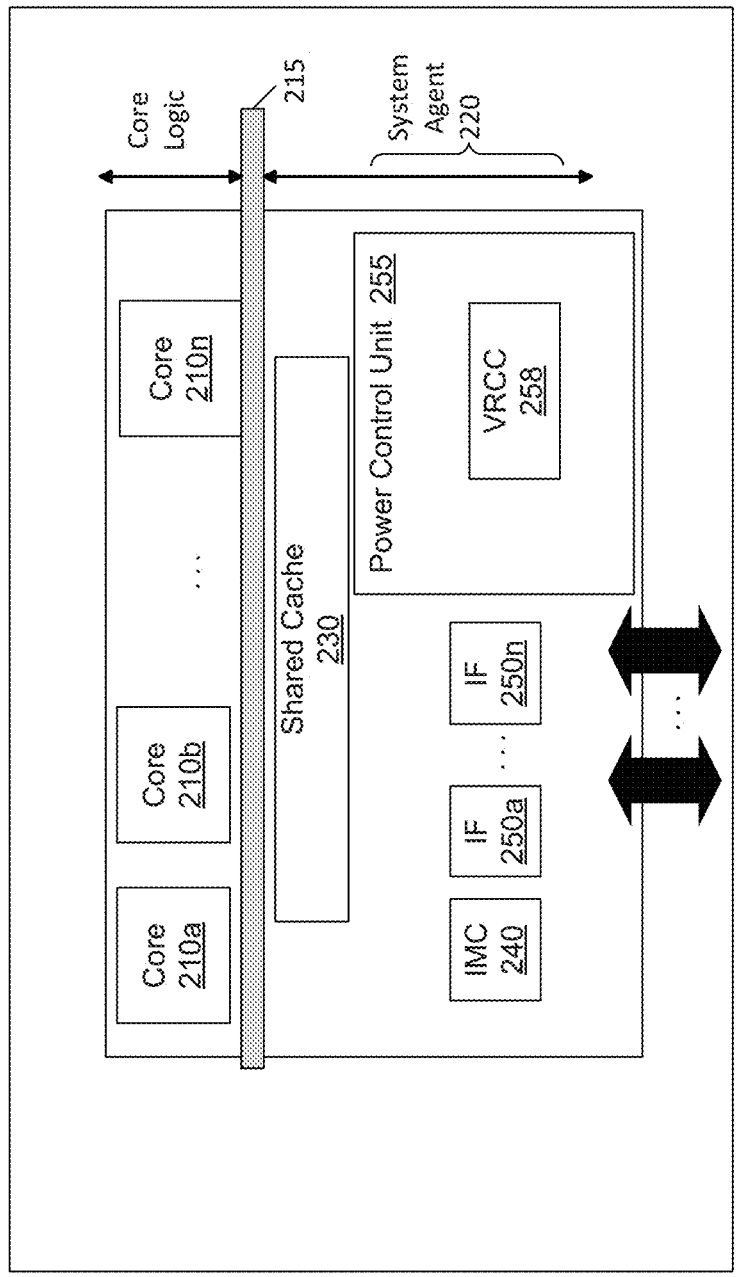
FIG. 2 is a block diagram of a processor in accordance with an embodiment of the present invention.

Embodiments can be implemented in processors for various markets including server processors, desktop processors, mobile processors and so forth. Referring now to FIG. 2, shown is a block diagram of a processor in accordance with an embodiment of the present invention. As shown in FIG. 2, processor 200 may be a multicore processor including a plurality of cores 210$_a$-210$_n$. In one embodiment, each such core may be of an independent power domain and can be configured to enter and exit active states and/or maximum performance states based on workload. The various cores may be coupled via an interconnect 215 to a system agent 220 that includes various components. As seen, system agent 220 may include a shared cache 230 which may be a last level cache. In addition, the system agent may include an integrated memory controller 240 to communicate with a system memory (not shown in FIG. 2), e.g., via a memory bus. System agent 220 also includes various interfaces 250 and a power control unit 255, which may include logic to perform the power management techniques described herein. In the embodiment shown, power control unit 255 includes a voltage regulator control circuit 258 that may dynamically, based at least in part on a classified workload in execution on processor 200, identify an appropriate power state profile from a plurality of power state profiles. And in turn, based at least in part on detected current consumption, voltage regulator control circuit 258 may select a given power state for one or more voltage regulators and send corresponding commands to such voltage regulators to cause update to their configuration to the selected power state, as described further herein.

In addition, by interfaces 250a-250n, connection can be made to various off-chip components such as peripheral devices, mass storage and so forth. While shown with this particular implementation in the embodiment of FIG. 2, the scope of the present invention is not limited in this regard.

Figure 3:
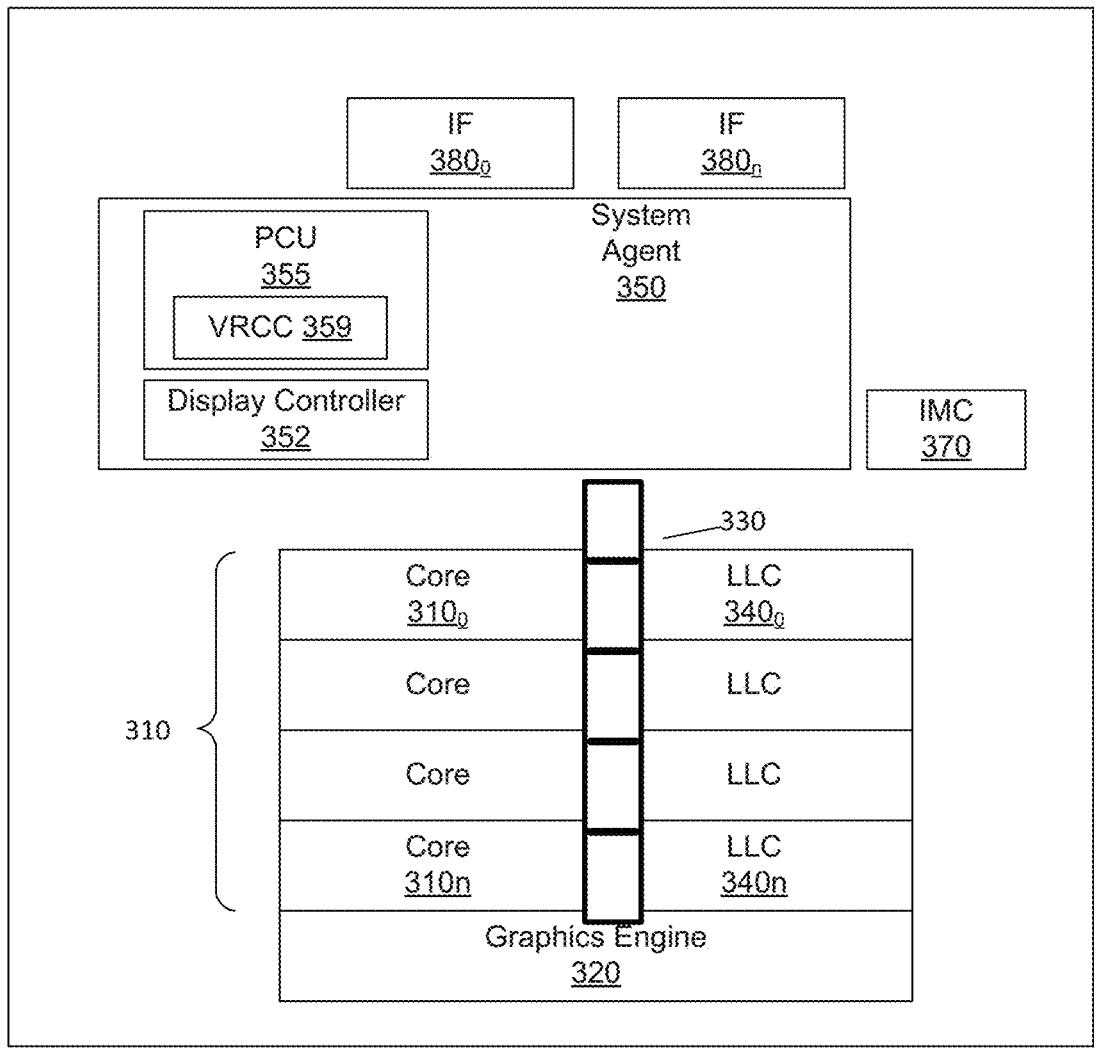
FIG. 3 is a block diagram of a multi-domain processor in accordance with another embodiment of the present invention.

Referring now to FIG. 3, shown is a block diagram of a multi-domain processor in accordance with another embodiment of the present invention. As shown in the embodiment of FIG. 3, processor 300 includes multiple domains. Specifically, a core domain 310 can include a plurality of cores $310_0$-$310_n$, a graphics domain 320 can include one or more graphics engines, and a system agent domain 350 may further be present. In some embodiments, system agent domain 350 may execute at an independent frequency than the core domain and may remain powered on at all times to handle power control events and power management such that domains 310 and 320 can be controlled to dynamically enter into and exit high power and low power states. Each of domains 310 and 320 may operate at different voltage and/or power. Note that while only shown with three domains, understand the scope of the present invention is not limited in this regard and additional domains can be present in other embodiments. For example, multiple core domains may be present each including at least one core. Note that in a multiple partition processor, multiple domains may be included in a single partition, while in other implementations each domain may be considered its own partition.

In general, each core 310 may further include low level caches in addition to various execution units and additional processing elements. In turn, the various cores may be coupled to each other and to a shared cache memory formed of a plurality of units of a last level cache (LLC) $340_0$-$340_n$. In various embodiments, LLC 340 may be shared amongst the cores and the graphics engine, as well as various media processing circuitry. As seen, a ring interconnect 330 thus couples the cores together, and provides interconnection between the cores, graphics domain 320 and system agent circuitry 350. In one embodiment, interconnect 330 can be part of the core domain. However in other embodiments the ring interconnect can be of its own domain.

As further seen, system agent domain 350 may include display controller 352 which may provide control of and an interface to an associated display. As further seen, system agent domain 350 may include a power control unit 355 which can include logic to perform the power management techniques described herein. In the embodiment shown, power control unit 355 includes a voltage regulator control circuit 359, which may be used to dynamically identify an appropriate power state profile from multiple power state profiles and cause update to a power state of one or more voltage regulators, based at least in part on workload classifications as described herein.

As further seen in FIG. 3, processor 300 can further include an integrated memory controller (IMC) 370 that can provide for an interface to a system memory, such as a dynamic random access memory (DRAM). Multiple interfaces $380_0$-$380_n$ may be present to enable interconnection between the processor and other circuitry. For example, in one embodiment at least one direct media interface (DMI) interface may be provided as well as one or more PCIe™ interfaces. Still further, to provide for communications between other agents such as additional processors or other circuitry, one or more QPI interfaces may also be provided. Although shown at this high level in the embodiment of FIG. 3, understand the scope of the present invention is not limited in this regard.

Figure 4:
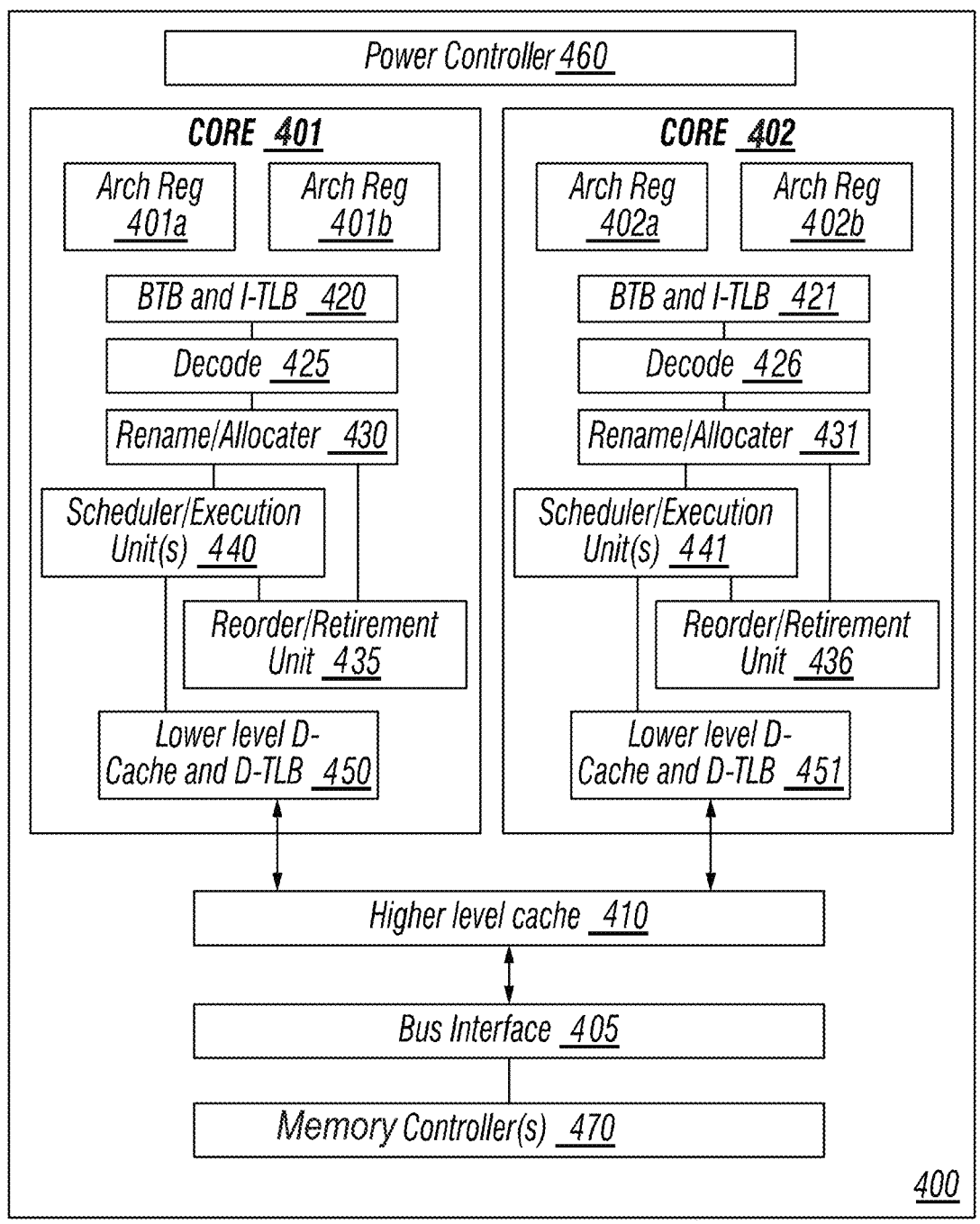
FIG. 4 is an embodiment of a processor including multiple cores.

Referring to FIG. 4, an embodiment of a processor including multiple cores is illustrated. Processor 400 includes any processor or processing device, such as a microprocessor, an embedded processor, a digital signal processor (DSP), a network processor, a handheld processor, an application processor, a co-processor, a system on a chip (SoC), or other device to execute code. Processor 400, in one embodiment, includes at least two cores—cores 401 and 402, which may include asymmetric cores or symmetric cores (the illustrated embodiment). However, processor 400 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 400, as illustrated in FIG. 4, includes two cores, cores 401 and 402. Here, cores 401 and 402 are considered symmetric cores, i.e., cores with the same configurations, functional units, and/or logic. In another embodiment, core 401 includes an out-of-order processor core, while core 402 includes an in-order processor core. However, cores 401 and 402 may be individually selected from any type of core, such as a native core, a software managed core, a core adapted to execute a native instruction set architecture (ISA), a core adapted to execute a translated ISA, a co-designed core, or other known core. Yet to further the discussion, the functional units illustrated in core 401 are described in further detail below, as the units in core 402 operate in a similar manner.

As depicted, core 401 includes two hardware threads 401a and 401b, which may also be referred to as hardware thread slots 401a and 401b. Therefore, software entities, such as an operating system, in one embodiment potentially view processor 400 as four separate processors, i.e., four logical processors or processing elements capable of executing four software threads concurrently. As alluded to above, a first thread is associated with architecture state registers 401a, a second thread is associated with architecture state registers 401b, a third thread may be associated with architecture state registers 402a, and a fourth thread may be associated with architecture state registers 402b. Here, each of the architecture state registers (401a, 401b, 402a, and 402b) may be referred to as processing elements, thread slots, or thread units, as described above. As illustrated, architecture state registers 401a are replicated in architecture state registers 401b, so individual architecture states/contexts are capable of being stored for logical processor 401a and logical processor 401b. In core 401, other smaller resources, such as instruction pointers and renaming logic in allocator and renamer block 430 may also be replicated for threads 401a and 401b. Some resources, such as re-order buffers in reorder/retirement unit 435, ILTB 420, load/store buffers, and queues may be shared through partitioning. Other resources, such as general purpose internal registers, page-table base register(s), low-level data-cache and data-TLB 415, execution unit(s) 440, and portions of out-of-order unit 435 are potentially fully shared.

Processor 400 often includes other resources, which may be fully shared, shared through partitioning, or dedicated by/to processing elements. In FIG. 4, an embodiment of a purely exemplary processor with illustrative logical units/resources of a processor is illustrated. Note that a processor may include, or omit, any of these functional units, as well as include any other known functional units, logic, or firmware not depicted. As illustrated, core 401 includes a simplified, representative out-of-order (OOO) processor core. But an in-order processor may be utilized in different embodiments. The OOO core includes a branch target buffer 420 to predict branches to be executed/taken and an instruction-translation buffer (I-TLB) 420 to store address translation entries for instructions.

Core 401 further includes decode module 425 coupled to fetch unit 420 to decode fetched elements. Fetch logic, in one embodiment, includes individual sequencers associated with thread slots 401a, 401b, respectively. Usually core 401 is associated with a first ISA, which defines/specifies instructions executable on processor 400. Often machine code instructions that are part of the first ISA include a portion of the instruction (referred to as an opcode), which references/specifies an instruction or operation to be performed. Decode logic 425 includes circuitry that recognizes these instructions from their opcodes and passes the decoded instructions on in the pipeline for processing as defined by the first ISA. For example, decoders 425, in one embodiment, include logic designed or adapted to recognize specific instructions, such as transactional instruction. As a result of the recognition by decoders 425, the architecture or core 401 takes specific, predefined actions to perform tasks associated with the appropriate instruction. It is important to note that any of the tasks, blocks, operations, and methods described herein may be performed in response to a single or multiple instructions; some of which may be new or old instructions.

In one example, allocator and renamer block 430 includes an allocator to reserve resources, such as register files to store instruction processing results. However, threads 401a and 401b are potentially capable of out-of-order execution, where allocator and renamer block 430 also reserves other resources, such as reorder buffers to track instruction results. Unit 430 may also include a register renamer to rename program/instruction reference registers to other registers internal to processor 400. Reorder/retirement unit 435 includes components, such as the reorder buffers mentioned above, load buffers, and store buffers, to support out-of-order execution and later in-order retirement of instructions executed out-of-order.

Scheduler and execution unit(s) block 440, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 450 are coupled to execution unit(s) 440. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 401 and 402 share access to higher-level or further-out cache 410, which is to cache recently fetched elements. Note that higher-level or further-out refers to cache levels increasing or getting further away from the execution unit(s). In one embodiment, higher-level cache 410 is a last-level data cache—last cache in the memory hierarchy on processor 400—such as a second or third level data cache. However, higher level cache 410 is not so limited, as it may be associated with or includes an instruction cache. A trace cache—a type of instruction cache—instead may be coupled after decoder 425 to store recently decoded traces.

In the depicted configuration, processor 400 also includes bus interface module 405 and a power controller 460, which may perform power management in accordance with an embodiment of the present invention. In this scenario, bus interface 405 is to communicate with devices external to processor 400, such as system memory and other components.

A memory controller 470 may interface with other devices such as one or many memories. In an example, bus interface 405 includes a ring interconnect with a memory controller for interfacing with a memory and a graphics controller for interfacing with a graphics processor. In an SoC environment, even more devices, such as a network interface, coprocessors, memory, graphics processor, and any other known computer devices/interface may be integrated on a single die or integrated circuit to provide small form factor with high functionality and low power consumption.

Figure 5:
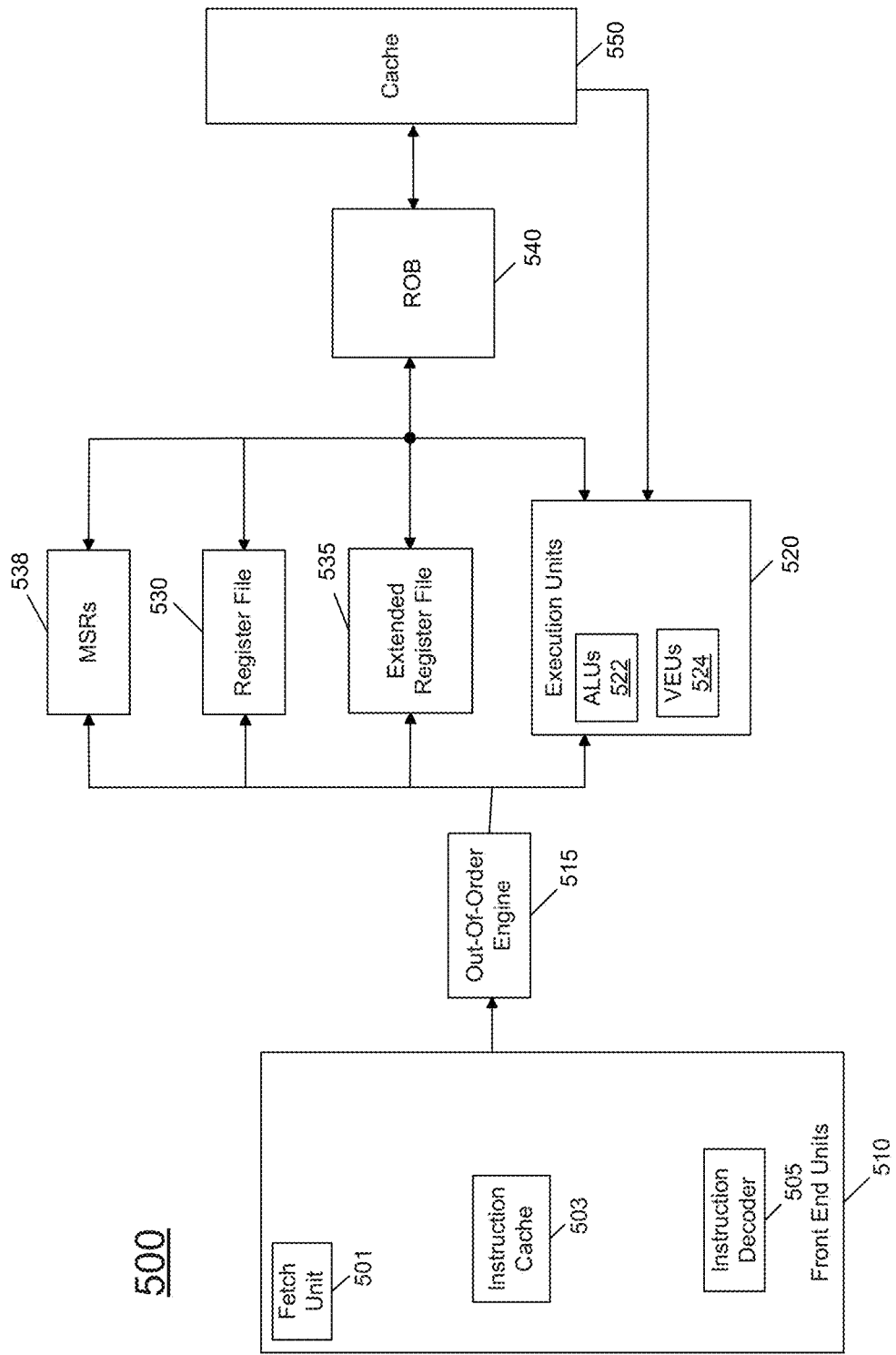
FIG. 5 is a block diagram of a micro-architecture of a processor core in accordance with one embodiment of the present invention.

Referring now to FIG. 5, shown is a block diagram of a micro-architecture of a processor core in accordance with one embodiment of the present invention. As shown in FIG. 5, processor core 500 may be a multi-stage pipelined out-of-order processor. Core 500 may operate at various voltages based on a received operating voltage, which may be received from an integrated voltage regulator or external voltage regulator.

As seen in FIG. 5, core 500 includes front end units 510, which may be used to fetch instructions to be executed and prepare them for use later in the processor pipeline. For example, front end units 510 may include a fetch unit 501, an instruction cache 503, and an instruction decoder 505. In some implementations, front end units 510 may further include a trace cache, along with microcode storage as well as a micro-operation storage. Fetch unit 501 may fetch macro-instructions, e.g., from memory or instruction cache 503, and feed them to instruction decoder 505 to decode them into primitives, i.e., micro-operations for execution by the processor.

Coupled between front end units 510 and execution units 520 is an out-of-order (OOO) engine 515 that may be used to receive the micro-instructions and prepare them for execution. More specifically OOO engine 515 may include various buffers to re-order micro-instruction flow and allocate various resources needed for execution, as well as to provide renaming of logical registers onto storage locations within various register files such as register file 530 and extended register file 535. Register file 530 may include separate register files for integer and floating point operations. Extended register file 535 may provide storage for vector-sized units, e.g., 256 or 512 bits per register. For purposes of configuration, control, and additional operations, a set of machine specific registers (MSRs) 538 may also be present and accessible to various logic within core 500 (and external to the core).

Various resources may be present in execution units 520, including, for example, various integer, floating point, and single instruction multiple data (SIMD) logic units, among other specialized hardware. For example, such execution units may include one or more arithmetic logic units (ALUs) 522 and one or more vector execution units 524, among other such execution units.

Results from the execution units may be provided to retirement logic, namely a reorder buffer (ROB) 540. More specifically, ROB 540 may include various arrays and logic to receive information associated with instructions that are executed. This information is then examined by ROB 540 to determine whether the instructions can be validly retired and result data committed to the architectural state of the processor, or whether one or more exceptions occurred that prevent a proper retirement of the instructions. Of course, ROB 540 may handle other operations associated with retirement.

As shown in FIG. 5, ROB 540 is coupled to a cache 550 which, in one embodiment may be a low level cache (e.g., an L1 cache) although the scope of the present invention is not limited in this regard. Also, execution units 520 can be directly coupled to cache 550. From cache 550, data communication may occur with higher level caches, system memory and so forth. While shown with this high level in the embodiment of FIG. 5, understand the scope of the present invention is not limited in this regard. For example, while the implementation of FIG. 5 is with regard to an out-of-order machine such as of an Intel® x86 instruction set architecture (ISA), the scope of the present invention is not limited in this regard. That is, other embodiments may be implemented in an in-order processor, a reduced instruction set computing (RISC) processor such as an ARM-based processor, or a processor of another type of ISA that can emulate instructions and operations of a different ISA via an emulation engine and associated logic circuitry.

Figure 6:
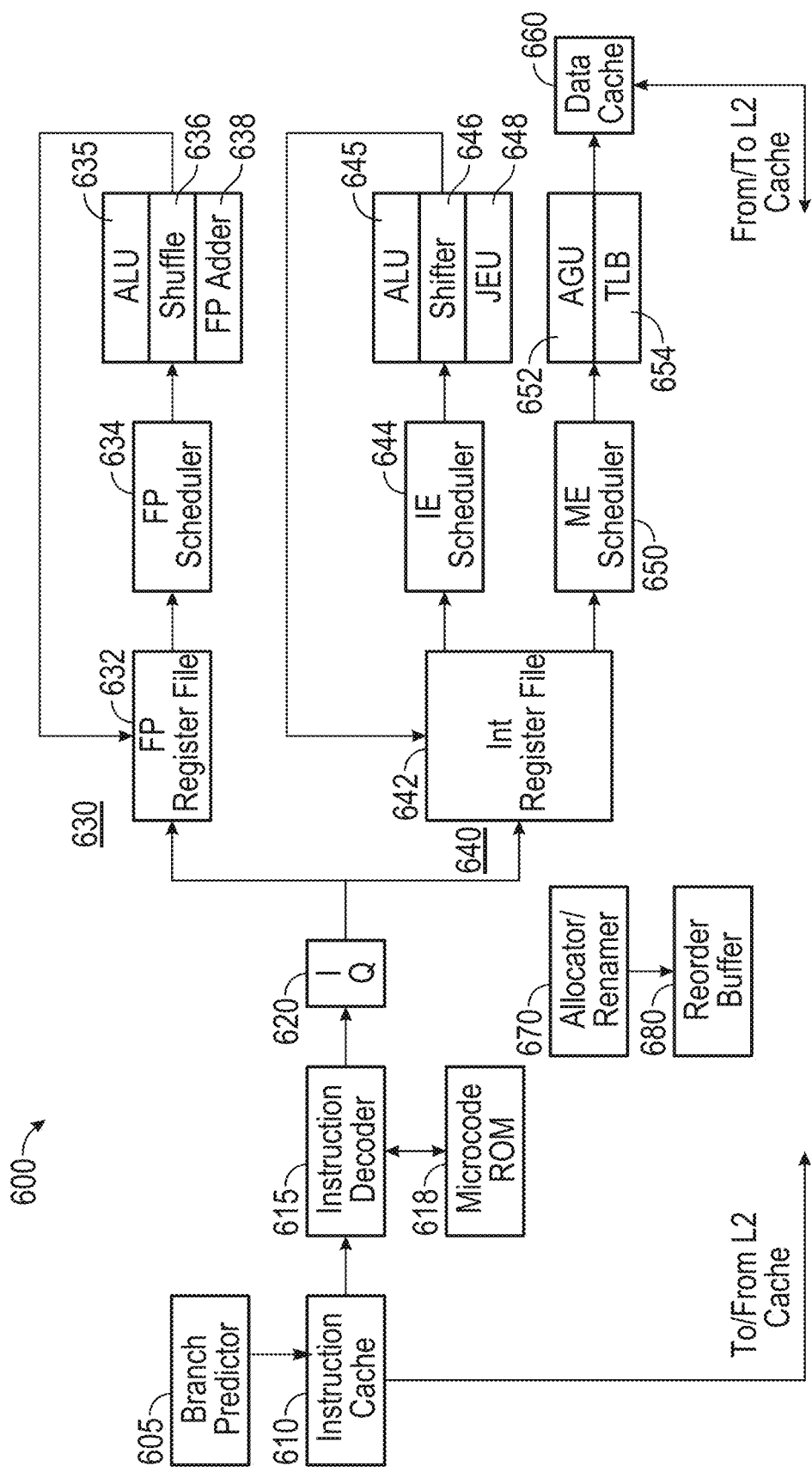
FIG. 6 is a block diagram of a micro-architecture of a processor core in accordance with another embodiment.

Referring now to FIG. 6, shown is a block diagram of a micro-architecture of a processor core in accordance with another embodiment. In the embodiment of FIG. 6, core 600 may be a low power core of a different micro-architecture, such as an Intel® Atom™-based processor having a relatively limited pipeline depth designed to reduce power consumption. As seen, core 600 includes an instruction cache 610 coupled to provide instructions to an instruction decoder 615. A branch predictor 605 may be coupled to instruction cache 610. Note that instruction cache 610 may further be coupled to another level of a cache memory, such as an L2 cache (not shown for ease of illustration in FIG. 6). In turn, instruction decoder 615 provides decoded instructions to an issue queue 620 for storage and delivery to a given execution pipeline. A microcode ROM 618 is coupled to instruction decoder 615.

A floating point pipeline 630 includes a floating point register file 632 which may include a plurality of architectural registers of a given bit with such as 128, 256 or 512 bits. Pipeline 630 includes a floating point scheduler 634 to schedule instructions for execution on one of multiple execution units of the pipeline. In the embodiment shown, such execution units include an ALU 635, a shuffle unit 636, and a floating point adder 638. In turn, results generated in these execution units may be provided back to buffers and/or registers of register file 632. Of course understand while shown with these few example execution units, additional or different floating point execution units may be present in another embodiment.

An integer pipeline 640 also may be provided. In the embodiment shown, pipeline 640 includes an integer register file 642 which may include a plurality of architectural registers of a given bit width such as 128 or 256 bits. Pipeline 640 includes an integer scheduler 644 to schedule instructions for execution on one of multiple execution units of the pipeline. In the embodiment shown, such execution units include an ALU 645, a shifter unit 646, and a jump execution unit 648. In turn, results generated in these execution units may be provided back to buffers and/or registers of register file 642. Of course understand while shown with these few example execution units, additional or different integer execution units may be present in another embodiment.

A memory execution scheduler 650 may schedule memory operations for execution in an address generation unit 652, which is also coupled to a TLB 654. As seen, these structures may couple to a data cache 660, which may be a L0 and/or L1 data cache that in turn couples to additional levels of a cache memory hierarchy, including an L2 cache memory.

To provide support for out-of-order execution, an allocator/renamer 670 may be provided, in addition to a reorder buffer 680, which is configured to reorder instructions executed out of order for retirement in order. Although shown with this particular pipeline architecture in the illustration of FIG. 6, understand that many variations and alternatives are possible.

Note that in a processor having asymmetric cores, such as in accordance with the micro-architectures of FIGS. 5 and 6, workloads may be dynamically swapped between the cores for power management reasons, as these cores, although having different pipeline designs and depths, may be of the same or related ISA. Such dynamic core swapping may be performed in a manner transparent to a user application (and possibly kernel also).

Figure 7:
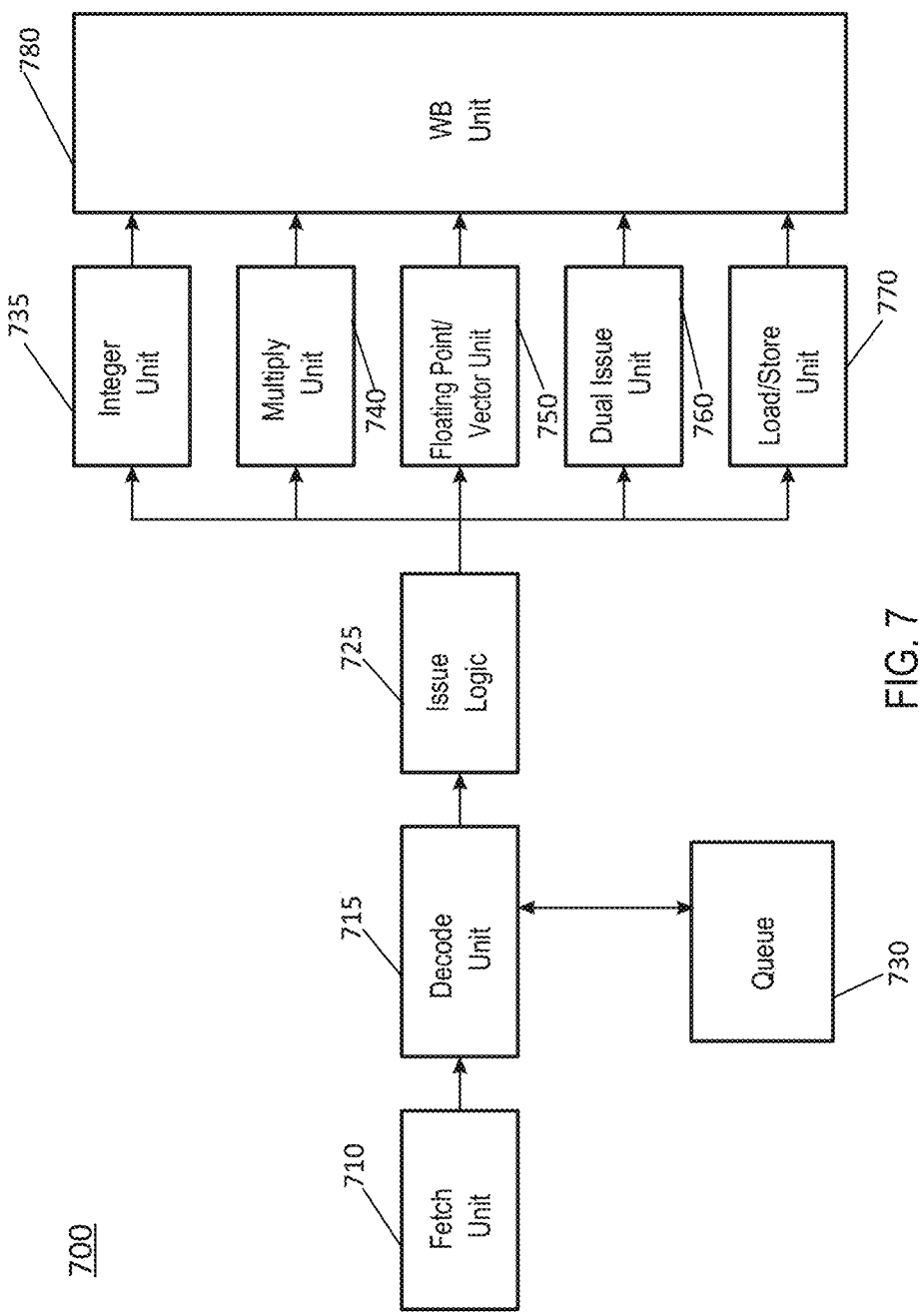
FIG. 7 is a block diagram of a micro-architecture of a processor core in accordance with yet another embodiment.

Referring to FIG. 7, shown is a block diagram of a micro-architecture of a processor core in accordance with yet another embodiment. As illustrated in FIG. 7, a core 700 may include a multi-staged in-order pipeline to execute at very low power consumption levels. As one such example, processor 700 may have a micro-architecture in accordance with an ARM Cortex A53 design available from ARM Holdings, LTD., Sunnyvale, Calif. In an implementation, an 8-stage pipeline may be provided that is configured to execute both 32-bit and 64-bit code. Core 700 includes a fetch unit 710 that is configured to fetch instructions and provide them to a decode unit 715, which may decode the instructions, e.g., macro-instructions of a given ISA such as an ARMv8 ISA. Note further that a queue 730 may couple to decode unit 715 to store decoded instructions. Decoded instructions are provided to an issue logic 725, where the decoded instructions may be issued to a given one of multiple execution units.

With further reference to FIG. 7, issue logic 725 may issue instructions to one of multiple execution units. In the embodiment shown, these execution units include an integer unit 735, a multiply unit 740, a floating point/vector unit 750, a dual issue unit 760, and a load/store unit 770. The results of these different execution units may be provided to a writeback unit 780. Understand that while a single writeback unit is shown for ease of illustration, in some implementations separate writeback units may be associated with each of the execution units. Furthermore, understand that while each of the units and logic shown in FIG. 7 is represented at a high level, a particular implementation may include more or different structures. A processor designed using one or more cores having a pipeline as in FIG. 7 may be implemented in many different end products, extending from mobile devices to server systems.

Figure 8:
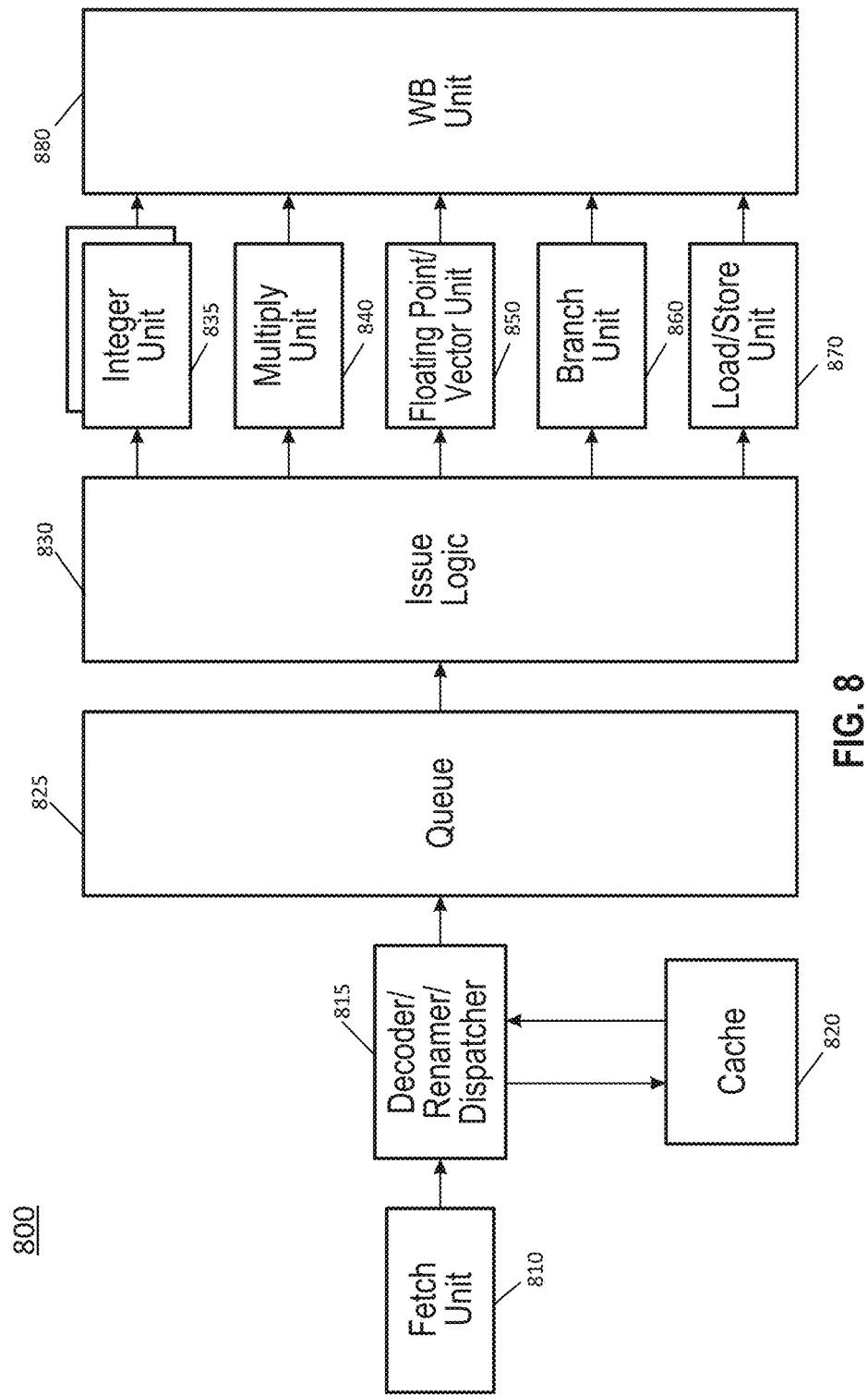
FIG. 8 is a block diagram of a micro-architecture of a processor core in accordance with a still further embodiment.

Referring to FIG. 8, shown is a block diagram of a micro-architecture of a processor core in accordance with a still further embodiment. As illustrated in FIG. 8, a core 800 may include a multi-stage multi-issue out-of-order pipeline to execute at very high performance levels (which may occur at higher power consumption levels than core 700 of FIG. 7). As one such example, processor 800 may have a microarchitecture in accordance with an ARM Cortex A57 design. In an implementation, a 15 (or greater)-stage pipeline may be provided that is configured to execute both 32-bit and 64-bit code. In addition, the pipeline may provide for 3 (or greater)-wide and 3 (or greater)-issue operation. Core 800 includes a fetch unit 810 that is configured to fetch instructions and provide them to a decoder/renamer/dispatcher 815, which may decode the instructions, e.g., macro-instructions of an ARMv8 instruction set architecture, rename register references within the instructions, and dispatch the instructions (eventually) to a selected execution unit. Decoded instructions may be stored in a queue 825. Note that while a single queue structure is shown for ease of illustration in FIG. 8, understand that separate queues may be provided for each of the multiple different types of execution units.

Also shown in FIG. 8 is an issue logic 830 from which decoded instructions stored in queue 825 may be issued to a selected execution unit. Issue logic 830 also may be implemented in a particular embodiment with a separate issue logic for each of the multiple different types of execution units to which issue logic 830 couples.

Decoded instructions may be issued to a given one of multiple execution units. In the embodiment shown, these execution units include one or more integer units 835, a multiply unit 840, a floating point/vector unit 850, a branch unit 860, and a load/store unit 870. In an embodiment, floating point/vector unit 850 may be configured to handle SIMD or vector data of 128 or 256 bits. Still further, floating point/vector execution unit 850 may perform IEEE-754 double precision floating-point operations. The results of these different execution units may be provided to a writeback unit 880. Note that in some implementations separate writeback units may be associated with each of the execution units. Furthermore, understand that while each of the units and logic shown in FIG. 8 is represented at a high level, a particular implementation may include more or different structures.

Note that in a processor having asymmetric cores, such as in accordance with the micro-architectures of FIGS. 7 and 8, workloads may be dynamically swapped for power management reasons, as these cores, although having different pipeline designs and depths, may be of the same or related ISA. Such dynamic core swapping may be performed in a manner transparent to a user application (and possibly kernel also).

Figure 9:
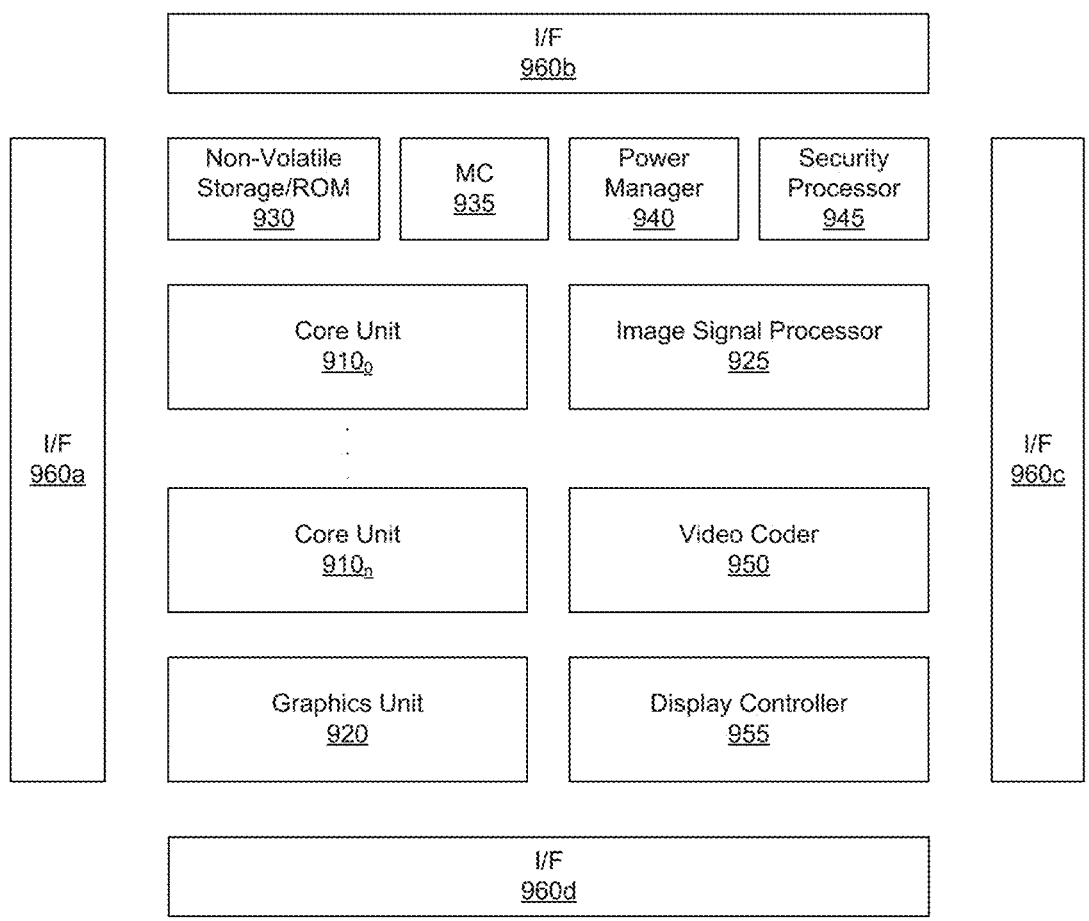
FIG. 9 is a block diagram of a processor in accordance with another embodiment of the present invention.

A processor designed using one or more cores having pipelines as in any one or more of FIGS. 5-8 may be implemented in many different end products, extending from mobile devices to server systems. Referring now to FIG. 9, shown is a block diagram of a processor in accordance with another embodiment of the present invention. In the embodiment of FIG. 9, processor 900 may be a SoC including multiple domains, each of which may be controlled to operate at an independent operating voltage and operating frequency. As a specific illustrative example, processor 900 may be an Intel® Architecture Core™-based processor such as an i3, i5, i7 or another such processor available from Intel Corporation. However, other low power processors such as available from Advanced Micro Devices, Inc. (AMD) of Sunnyvale, Calif., an ARM-based design from ARM Holdings, Ltd. or licensee thereof or a MIPS-based design from MIPS Technologies, Inc. of Sunnyvale, Calif., or their licensees or adopters may instead be present in other embodiments such as an Apple A7 processor, a Qualcomm Snapdragon processor, or Texas Instruments OMAP processor. Such SoC may be used in a low power system such as a smartphone, tablet computer, phablet computer, Ultrabook™ computer or other portable computing device or connected device.

In the high level view shown in FIG. 9, processor 900 includes a plurality of core units $910_0$-$910_n$. Each core unit may include one or more processor cores, one or more cache memories and other circuitry. Each core unit 910 may support one or more instructions sets (e.g., an x86 instruction set (with some extensions that have been added with newer versions); a MIPS instruction set; an ARM instruction set (with optional additional extensions such as NEON)) or other instruction set or combinations thereof. Note that some of the core units may be heterogeneous resources (e.g., of a different design). In addition, each such core may be coupled to a cache memory (not shown) which in an embodiment may be a shared level (L2) cache memory. A non-volatile storage 930 may be used to store various program and other data. For example, this storage may be used to store at least portions of microcode, boot information such as a BIOS, other system software or so forth.

Each core unit 910 may also include an interface such as a bus interface unit to enable interconnection to additional circuitry of the processor. In an embodiment, each core unit 910 couples to a coherent fabric that may act as a primary cache coherent on-die interconnect that in turn couples to a memory controller 935. In turn, memory controller 935 controls communications with a memory such as a DRAM (not shown for ease of illustration in FIG. 9).

In addition to core units, additional processing engines are present within the processor, including at least one graphics unit 920 which may include one or more graphics processing units (GPUs) to perform graphics processing as well as to possibly execute general purpose operations on the graphics processor (so-called GPGPU operation). In addition, at least one image signal processor 925 may be present. Signal processor 925 may be configured to process incoming image data received from one or more capture devices, either internal to the SoC or off-chip.

Other accelerators also may be present. In the illustration of FIG. 9, a video coder 950 may perform coding operations including encoding and decoding for video information, e.g., providing hardware acceleration support for high definition video content. A display controller 955 further may be provided to accelerate display operations including providing support for internal and external displays of a system. In addition, a security processor 945 may be present to perform security operations such as secure boot operations, various cryptography operations and so forth.

Each of the units may have its power consumption controlled via a power manager 940, which may include control logic to perform the various power management techniques described herein.

In some embodiments, SoC 900 may further include a non-coherent fabric coupled to the coherent fabric to which various peripheral devices may couple. One or more interfaces 960a-960d enable communication with one or more off-chip devices. Such communications may be via a variety of communication protocols such as PCIe™, GPIO, USB, I²C, UART, MIPI, SDIO, DDR, SPI, HDMI, among other types of communication protocols. Although shown at this high level in the embodiment of FIG. 9, understand the scope of the present invention is not limited in this regard.

Figure 10:
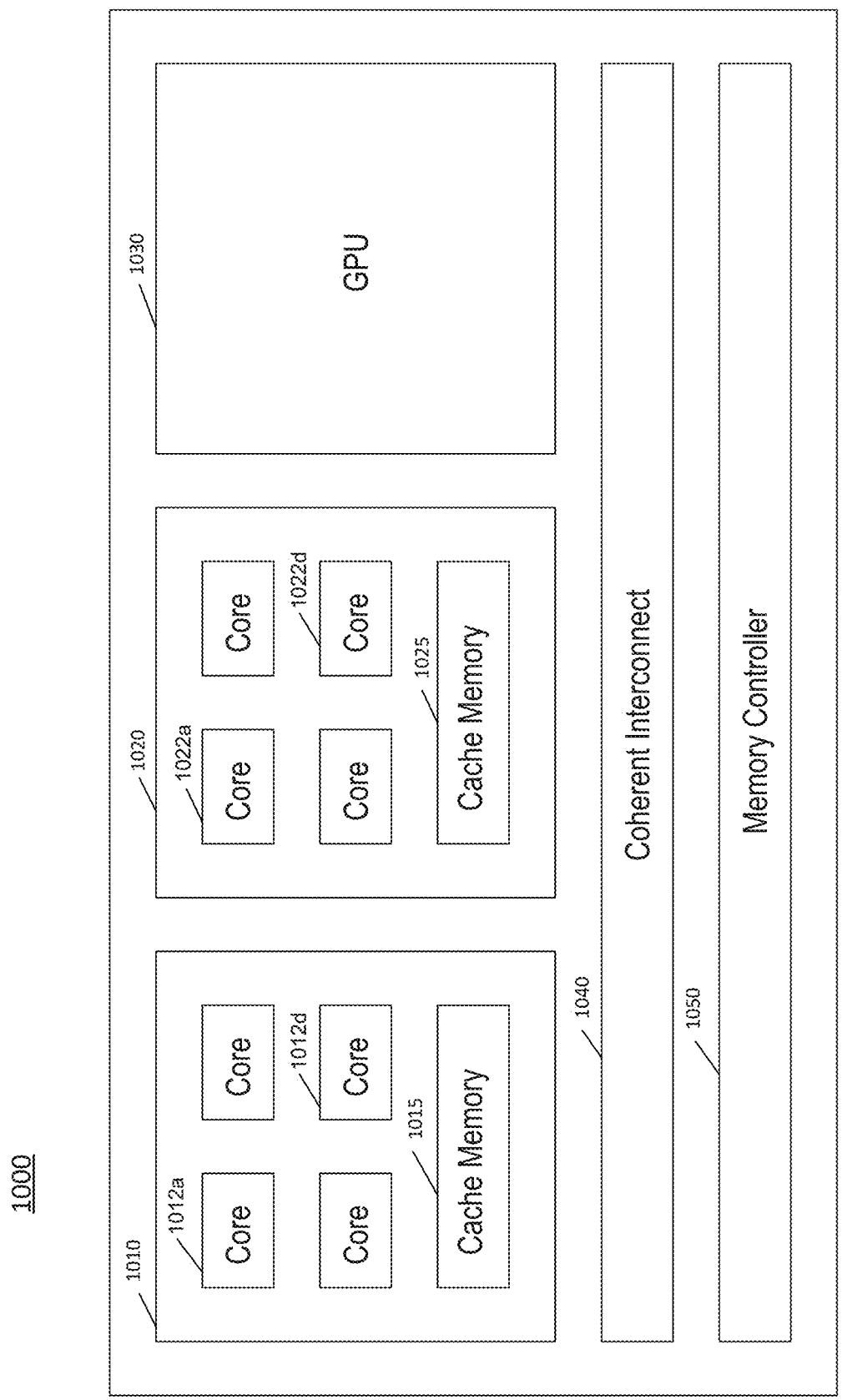
FIG. 10 is a block diagram of a representative SoC in accordance with an embodiment of the present invention.

Referring now to FIG. 10, shown is a block diagram of a representative SoC. In the embodiment shown, SoC 1000 may be a multi-core SoC configured for low power operation to be optimized for incorporation into a smartphone or other low power device such as a tablet computer or other portable computing device. As an example, SoC 1000 may be implemented using asymmetric or different types of cores, such as combinations of higher power and/or low power cores, e.g., out-of-order cores and in-order cores. In different embodiments, these cores may be based on an Intel® Architecture™ core design or an ARM architecture design. In yet other embodiments, a mix of Intel® and ARM cores may be implemented in a given SoC.

As seen in FIG. 10, SoC 1000 includes a first core domain 1010 having a plurality of first cores $1012_0$-$1012_3$. In an example, these cores may be low power cores such as in-order cores. In one embodiment these first cores may be implemented as ARM Cortex A53 cores. In turn, these cores couple to a cache memory 1015 of core domain 1010. In addition, SoC 1000 includes a second core domain 1020. In the illustration of FIG. 10, second core domain 1020 has a plurality of second cores $1022_0$-$1022_3$. In an example, these cores may be higher power-consuming cores than first cores 1012. In an embodiment, the second cores may be out-of-order cores, which may be implemented as ARM Cortex A57 cores. In turn, these cores couple to a cache memory 1025 of core domain 1020. Note that while the example shown in FIG. 10 includes 4 cores in each domain, understand that more or fewer cores may be present in a given domain in other examples.

With further reference to FIG. 10, a graphics domain 1030 also is provided, which may include one or more graphics processing units (GPUs) configured to independently execute graphics workloads, e.g., provided by one or more cores of core domains 1010 and 1020. As an example, GPU domain 1030 may be used to provide display support for a variety of screen sizes, in addition to providing graphics and display rendering operations.

As seen, the various domains couple to a coherent interconnect 1040, which in an embodiment may be a cache coherent interconnect fabric that in turn couples to an integrated memory controller 1050. Coherent interconnect 1040 may include a shared cache memory, such as an L3 cache, in some examples. In an embodiment, memory controller 1050 may be a direct memory controller to provide for multiple channels of communication with an off-chip memory, such as multiple channels of a DRAM (not shown for ease of illustration in FIG. 10).

In different examples, the number of the core domains may vary. For example, for a low power SoC suitable for incorporation into a mobile computing device, a limited number of core domains such as shown in FIG. 10 may be present. Still further, in such low power SoCs, core domain 1020 including higher power cores may have fewer numbers of such cores. For example, in one implementation two cores 1022 may be provided to enable operation at reduced power consumption levels. In addition, the different core domains may also be coupled to an interrupt controller to enable dynamic swapping of workloads between the different domains.

In yet other embodiments, a greater number of core domains, as well as additional optional IP logic may be present, in that an SoC can be scaled to higher performance (and power) levels for incorporation into other computing devices, such as desktops, servers, high performance computing systems, base stations forth. As one such example, 4 core domains each having a given number of out-of-order cores may be provided. Still further, in addition to optional GPU support (which as an example may take the form of a GPGPU), one or more accelerators to provide optimized hardware support for particular functions (e.g. web serving, network processing, switching or so forth) also may be provided. In addition, an input/output interface may be present to couple such accelerators to off-chip components.

Figure 11:
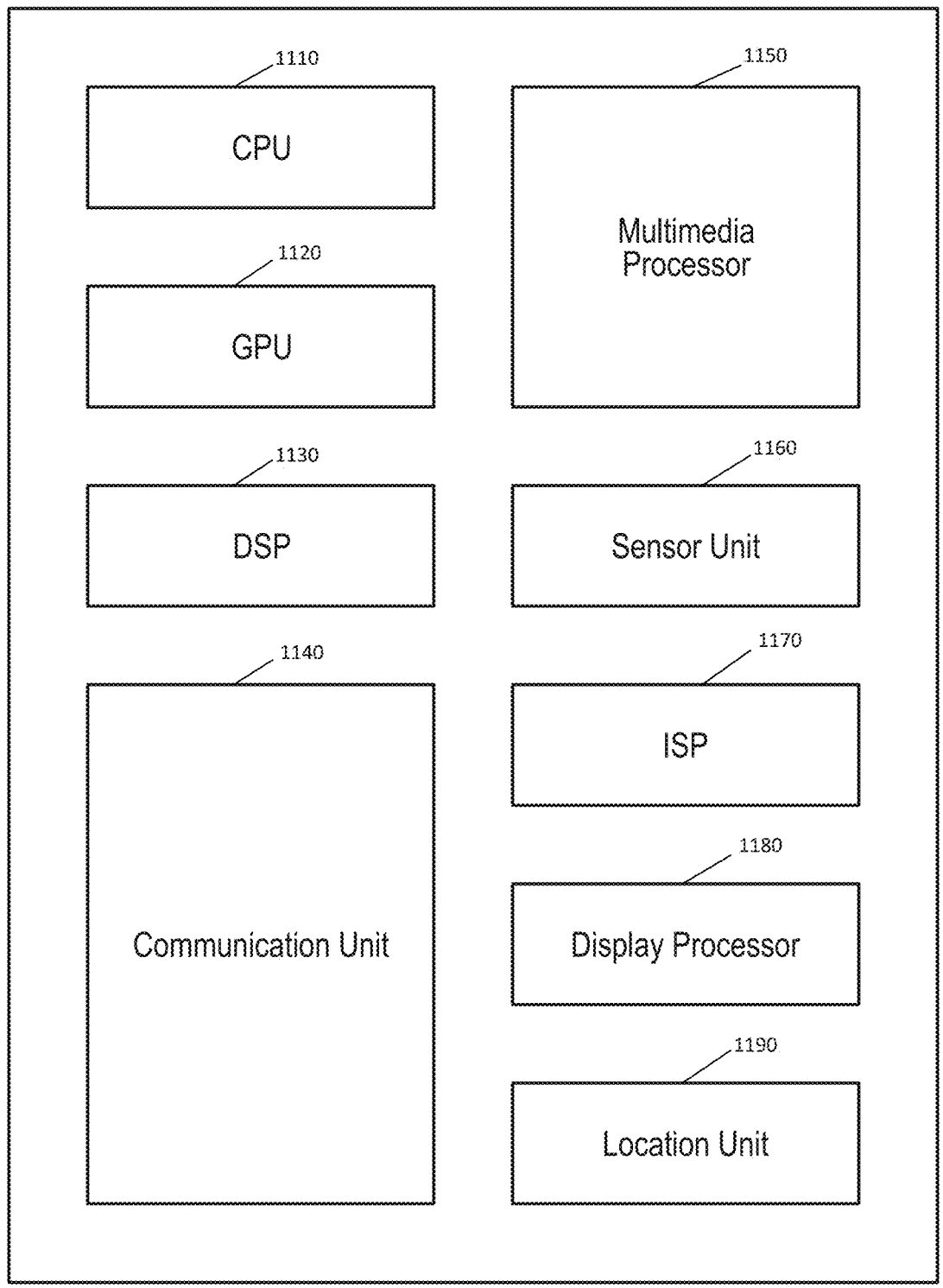
FIG. 11 is a block diagram of another example SoC in accordance with an embodiment of the present invention.

Referring now to FIG. 11, shown is a block diagram of another example SoC. In the embodiment of FIG. 11, SoC 1100 may include various circuitry to enable high performance for multimedia applications, communications and other functions. As such, SoC 1100 is suitable for incorporation into a wide variety of portable and other devices, such as smartphones, tablet computers, smart TVs and so forth. In the example shown, SoC 1100 includes a central processor unit (CPU) domain 1110. In an embodiment, a plurality of individual processor cores may be present in CPU domain 1110. As one example, CPU domain 1110 may be a quad core processor having 4 multithreaded cores. Such processors may be homogeneous or heterogeneous processors, e.g., a mix of low power and high power processor cores.

In turn, a GPU domain 1120 is provided to perform advanced graphics processing in one or more GPUs to handle graphics and compute APIs. A DSP unit 1130 may provide one or more low power DSPs for handling low-power multimedia applications such as music playback, audio/video and so forth, in addition to advanced calculations that may occur during execution of multimedia instructions. In turn, a communication unit 1140 may include various components to provide connectivity via various wireless protocols, such as cellular communications (including 3G/4G LTE), wireless local area protocols such as Bluetooth™ IEEE 802.11, and so forth.

Still further, a multimedia processor 1150 may be used to perform capture and playback of high definition video and audio content, including processing of user gestures. A sensor unit 1160 may include a plurality of sensors and/or a sensor controller to interface to various off-chip sensors present in a given platform. An image signal processor 1170 may be provided with one or more separate ISPs to perform image processing with regard to captured content from one or more cameras of a platform, including still and video cameras.

A display processor 1180 may provide support for connection to a high definition display of a given pixel density, including the ability to wirelessly communicate content for playback on such display. Still further, a location unit 1190 may include a GPS receiver with support for multiple GPS constellations to provide applications highly accurate positioning information obtained using as such GPS receiver. Understand that while shown with this particular set of components in the example of FIG. 11, many variations and alternatives are possible.

Figure 12:
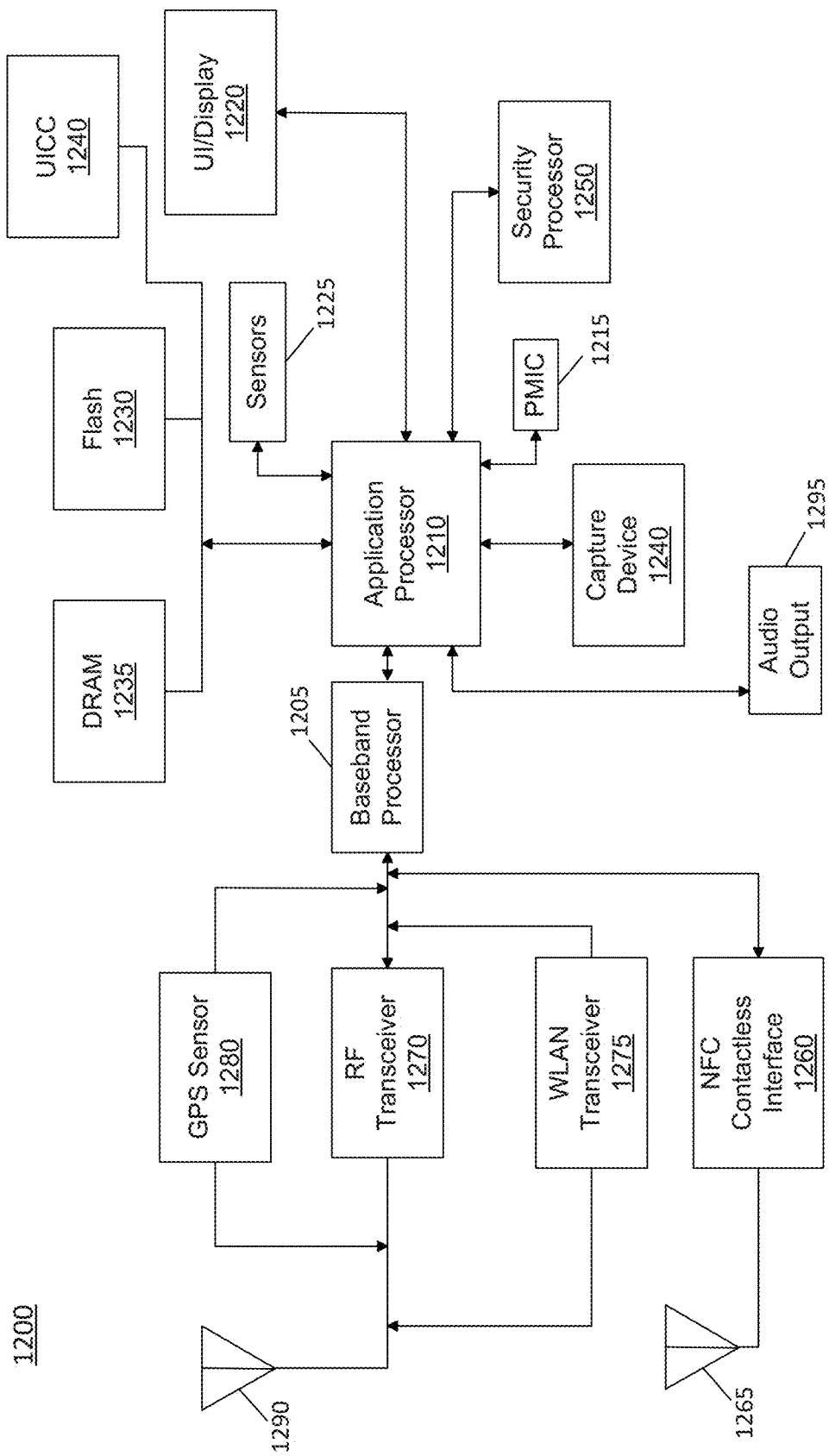
FIG. 12 is a block diagram of an example system with which embodiments can be used.

Referring now to FIG. 12, shown is a block diagram of an example system with which embodiments can be used. As seen, system 1200 may be a smartphone or other wireless communicator. A baseband processor 1205 is configured to perform various signal processing with regard to communication signals to be transmitted from or received by the system. In turn, baseband processor 1205 is coupled to an application processor 1210, which may be a main CPU of the system to execute an OS and other system software, in addition to user applications such as many well-known social media and multimedia apps. Application processor 1210 may further be configured to perform a variety of other computing operations for the device and perform the power management techniques described herein.

In turn, application processor 1210 can couple to a user interface/display 1220, e.g., a touch screen display. In addition, application processor 1210 may couple to a memory system including a non-volatile memory, namely a flash memory 1230 and a system memory, namely a dynamic random access memory (DRAM) 1235. As further seen, application processor 1210 further couples to a capture device 1240 such as one or more image capture devices that can record video and/or still images.

Still referring to FIG. 12, a universal integrated circuit card (UICC) 1240 comprising a subscriber identity module and possibly a secure storage and cryptoprocessor is also coupled to application processor 1210. System 1200 may further include a security processor 1250 that may couple to application processor 1210. A plurality of sensors 1225 may couple to application processor 1210 to enable input of a variety of sensed information such as accelerometer and other environmental information. An audio output device 1295 may provide an interface to output sound, e.g., in the form of voice communications, played or streaming audio data and so forth.

As further illustrated, a near field communication (NFC) contactless interface 1260 is provided that communicates in a NFC near field via an NFC antenna 1265. While separate antennae are shown in FIG. 12, understand that in some implementations one antenna or a different set of antennae may be provided to enable various wireless functionality.

A PMIC 1215 couples to application processor 1210 to perform platform level power management. To this end, PMIC 1215 may issue power management requests to application processor 1210 to enter certain low power states as desired. Furthermore, based on platform constraints, PMIC 1215 may also control the power level of other components of system 1200.

To enable communications to be transmitted and received, various circuitry may be coupled between baseband processor 1205 and an antenna 1290. Specifically, a radio frequency (RF) transceiver 1270 and a wireless local area network (WLAN) transceiver 1275 may be present. In general, RF transceiver 1270 may be used to receive and transmit wireless data and calls according to a given wireless communication protocol such as 3G or 4G wireless communication protocol such as in accordance with a code division multiple access (CDMA), global system for mobile communication (GSM), long term evolution (LTE) or other protocol. In addition a GPS sensor 1280 may be present. Other wireless communications such as receipt or transmission of radio signals, e.g., AM/FM and other signals may also be provided. In addition, via WLAN transceiver 1275, local wireless communications can also be realized.

Figure 13:
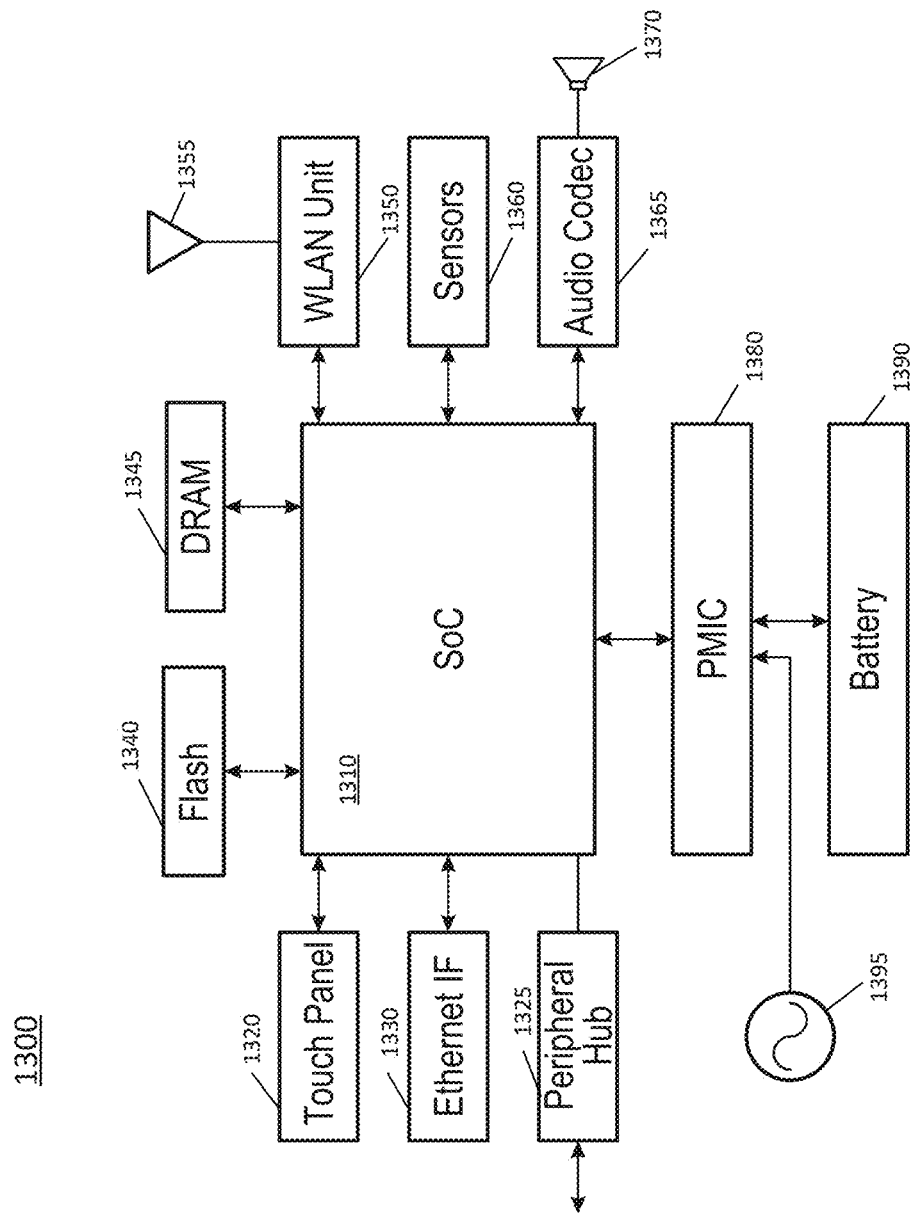
FIG. 13 is a block diagram of another example system with which embodiments may be used.

Referring now to FIG. 13, shown is a block diagram of another example system with which embodiments may be used. In the illustration of FIG. 13, system 1300 may be mobile low-power system such as a tablet computer, 2:1 tablet, phablet or other convertible or standalone tablet system. As illustrated, a SoC 1310 is present and may be configured to operate as an application processor for the device and perform the power management techniques described herein.

A variety of devices may couple to SoC 1310. In the illustration shown, a memory subsystem includes a flash memory 1340 and a DRAM 1345 coupled to SoC 1310. In addition, a touch panel 1320 is coupled to the SoC 1310 to provide display capability and user input via touch, including provision of a virtual keyboard on a display of touch panel 1320. To provide wired network connectivity, SoC 1310 couples to an Ethernet interface 1330. A peripheral hub 1325 is coupled to SoC 1310 to enable interfacing with various peripheral devices, such as may be coupled to system 1300 by any of various ports or other connectors.

In addition to internal power management circuitry and functionality within SoC 1310, a PMIC 1380 is coupled to SoC 1310 to provide platform-based power management, e.g., based on whether the system is powered by a battery 1390 or AC power via an AC adapter 1395. In addition to this power source-based power management, PMIC 1380 may further perform platform power management activities based on environmental and usage conditions. Still further, PMIC 1380 may communicate control and status information to SoC 1310 to cause various power management actions within SoC 1310.

Still referring to FIG. 13, to provide for wireless capabilities, a WLAN unit 1350 is coupled to SoC 1310 and in turn to an antenna 1355. In various implementations, WLAN unit 1350 may provide for communication according to one or more wireless protocols.

As further illustrated, a plurality of sensors 1360 may couple to SoC 1310. These sensors may include various accelerometer, environmental and other sensors, including user gesture sensors. Finally, an audio codec 1365 is coupled to SoC 1310 to provide an interface to an audio output device 1370. Of course understand that while shown with this particular implementation in FIG. 13, many variations and alternatives are possible.

Figure 14:
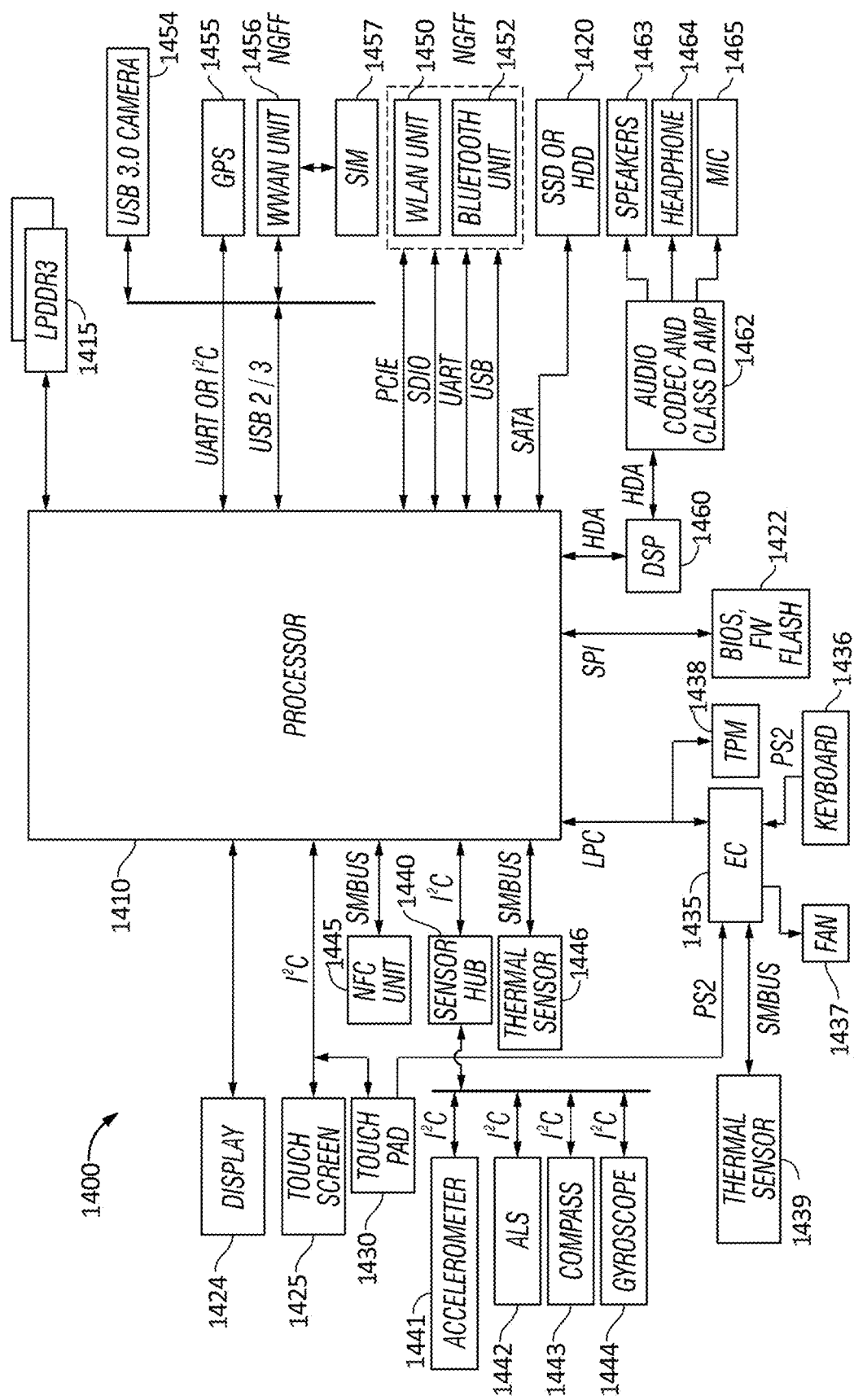
FIG. 14 is a block diagram of a representative computer system.

Referring now to FIG. 14, shown is a block diagram of a representative computer system such as notebook, Ultrabook™ or other small form factor system. A processor 1410, in one embodiment, includes a microprocessor, multi-core processor, multithreaded processor, an ultra low voltage processor, an embedded processor, or other known processing element. In the illustrated implementation, processor 1410 acts as a main processing unit and central hub for communication with many of the various components of the system 1400. As one example, processor 1400 is implemented as a SoC.

Processor 1410, in one embodiment, communicates with a system memory 1415. As an illustrative example, the system memory 1415 is implemented via multiple memory devices or modules to provide for a given amount of system memory.

To provide for persistent storage of information such as data, applications, one or more operating systems and so forth, a mass storage 1420 may also couple to processor 1410. In various embodiments, to enable a thinner and lighter system design as well as to improve system responsiveness, this mass storage may be implemented via a SSD or the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also shown in FIG. 14, a flash device 1422 may be coupled to processor 1410, e.g., via a serial peripheral interface (SPI). This flash device may provide for non-volatile storage of system software, including a basic input/output software (BIOS) as well as other firmware of the system.

Various input/output (I/O) devices may be present within system 1400. Specifically shown in the embodiment of FIG. 14 is a display 1424 which may be a high definition LCD or LED panel that further provides for a touch screen 1425. In one embodiment, display 1424 may be coupled to processor 1410 via a display interconnect that can be implemented as a high performance graphics interconnect. Touch screen 1425 may be coupled to processor 1410 via another interconnect, which in an embodiment can be an I²C interconnect. As further shown in FIG. 14, in addition to touch screen 1425, user input by way of touch can also occur via a touch pad 1430 which may be configured within the chassis and may also be coupled to the same I²C interconnect as touch screen 1425.

For perceptual computing and other purposes, various sensors may be present within the system and may be coupled to processor 1410 in different manners. Certain inertial and environmental sensors may couple to processor 1410 through a sensor hub 1440, e.g., via an $I_{2C}$ interconnect. In the embodiment shown in FIG. 14, these sensors may include an accelerometer 1441, an ambient light sensor (ALS) 1442, a compass 1443 and a gyroscope 1444. Other environmental sensors may include one or more thermal sensors 1446 which in some embodiments couple to processor 1410 via a system management bus (SMBus) bus.

Also seen in FIG. 14, various peripheral devices may couple to processor 1410 via a low pin count (LPC) interconnect. In the embodiment shown, various components can be coupled through an embedded controller 1435. Such components can include a keyboard 1436 (e.g., coupled via a PS2 interface), a fan 1437, and a thermal sensor 1439. In some embodiments, touch pad 1430 may also couple to EC 1435 via a PS2 interface. In addition, a security processor such as a trusted platform module (TPM) 1438 may also couple to processor 1410 via this LPC interconnect.

System 1400 can communicate with external devices in a variety of manners, including wirelessly. In the embodiment shown in FIG. 14, various wireless modules, each of which can correspond to a radio configured for a particular wireless communication protocol, are present. One manner for wireless communication in a short range such as a near field may be via a NFC unit 1445 which may communicate, in one embodiment with processor 1410 via an SMBus. Note that via this NFC unit 1445, devices in close proximity to each other can communicate.

As further seen in FIG. 14, additional wireless units can include other short range wireless engines including a WLAN unit 1450 and a Bluetooth unit 1452. Using WLAN unit 1450, Wi-Fi™ communications can be realized, while via Bluetooth unit 1452, short range Bluetooth™ communications can occur. These units may communicate with processor 1410 via a given link.

In addition, wireless wide area communications, e.g., according to a cellular or other wireless wide area protocol, can occur via a WWAN unit 1456 which in turn may couple to a subscriber identity module (SIM) 1457. In addition, to enable receipt and use of location information, a GPS module 1455 may also be present. Note that in the embodiment shown in FIG. 14, WWAN unit 1456 and an integrated capture device such as a camera module 1454 may communicate via a given link.

An integrated camera module 1454 can be incorporated in the lid. To provide for audio inputs and outputs, an audio processor can be implemented via a digital signal processor (DSP) 1460, which may couple to processor 1410 via a high definition audio (HDA) link. Similarly, DSP 1460 may communicate with an integrated coder/decoder (CODEC) and amplifier 1462 that in turn may couple to output speakers 1463 which may be implemented within the chassis. Similarly, amplifier and CODEC 1462 can be coupled to receive audio inputs from a microphone 1465 which in an embodiment can be implemented via dual array microphones (such as a digital microphone array) to provide for high quality audio inputs to enable voice-activated control of various operations within the system. Note also that audio outputs can be provided from amplifier/CODEC 1462 to a headphone jack 1464. Although shown with these particular components in the embodiment of FIG. 14, understand the scope of the present invention is not limited in this regard.

Figure 15:
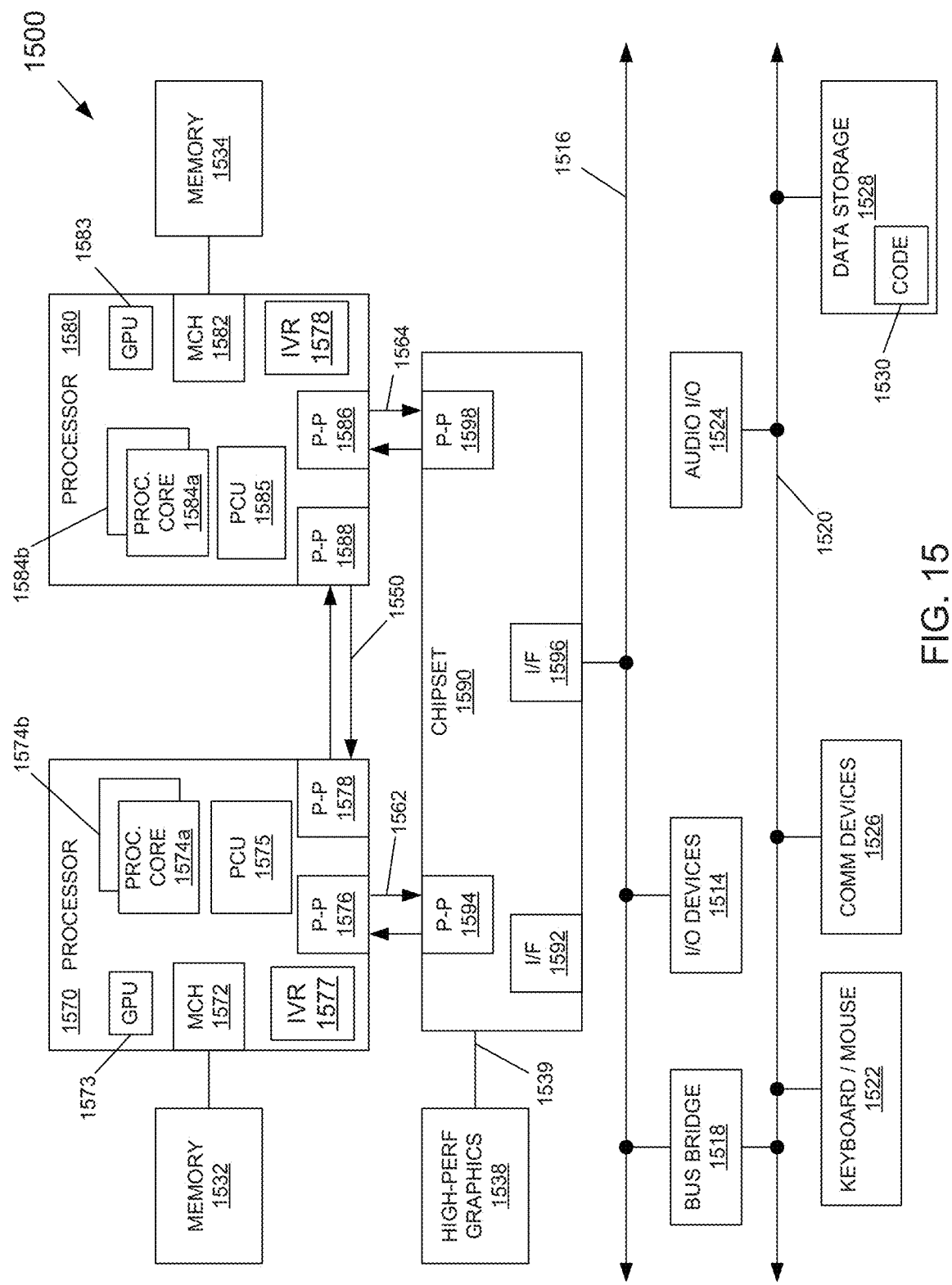
FIG. 15 is a block diagram of a system in accordance with an embodiment of the present invention.

Embodiments may be implemented in many different system types. Referring now to FIG. 15, shown is a block diagram of a system in accordance with an embodiment of the present invention. As shown in FIG. 15, multiprocessor system 1500 is a point-to-point interconnect system, and includes a first processor 1570 and a second processor 1580 coupled via a point-to-point interconnect 1550. As shown in FIG. 15, each of processors 1570 and 1580 may be multicore processors, including first and second processor cores (i.e., processors 1574a and 1574b and processor cores 1584a and 1584b), although potentially many more cores may be present in the processors. In addition, each of processors 1570 and 1580 also may include a graphics processor unit (GPU) 1573, 1583 to perform graphics operations. Each of processors 1570, 1580 can include a PCU 1575, 1585 to perform processor-based power management, including causing dynamic updates to a power state of one or more voltage regulators, including IVRs 1577, 1587, based at least in part on workload classification as described herein.

Still referring to FIG. 15, first processor 1570 further includes a memory controller hub (MCH) 1572 and pointto-point (P-P) interfaces 1576 and 1578. Similarly, second processor 1580 includes a MCH 1582 and P-P interfaces 1586 and 1588. As shown in FIG. 15, MCH's 1572 and 1582 couple the processors to respective memories, namely a memory 1532 and a memory 1534, which may be portions of system memory (e.g., DRAM) locally attached to the respective processors. First processor 1570 and second processor 1580 may be coupled to a chipset 1590 via P-P interconnects 1562 and 1564, respectively. As shown in FIG. 15, chipset 1590 includes P-P interfaces 1594 and 1598.

Furthermore, chipset 1590 includes an interface 1592 to couple chipset 1590 with a high performance graphics engine 1538, by a P-P interconnect 1539. In turn, chipset 1590 may be coupled to a first bus 1516 via an interface 1596. As shown in FIG. 15, various input/output (I/O) devices 1514 may be coupled to first bus 1516, along with a bus bridge 1518 which couples first bus 1516 to a second bus 1520. Various devices may be coupled to second bus 1520 including, for example, a keyboard/mouse 1522, communication devices 1526 and a data storage unit 1528 such as a disk drive or other mass storage device which may include code 1530, in one embodiment. Further, an audio I/O 1524 may be coupled to second bus 1520. Embodiments can be incorporated into other types of systems including mobile devices such as a smart cellular telephone, tablet computer, netbook, Ultrabook™, or so forth.

Figure 16:
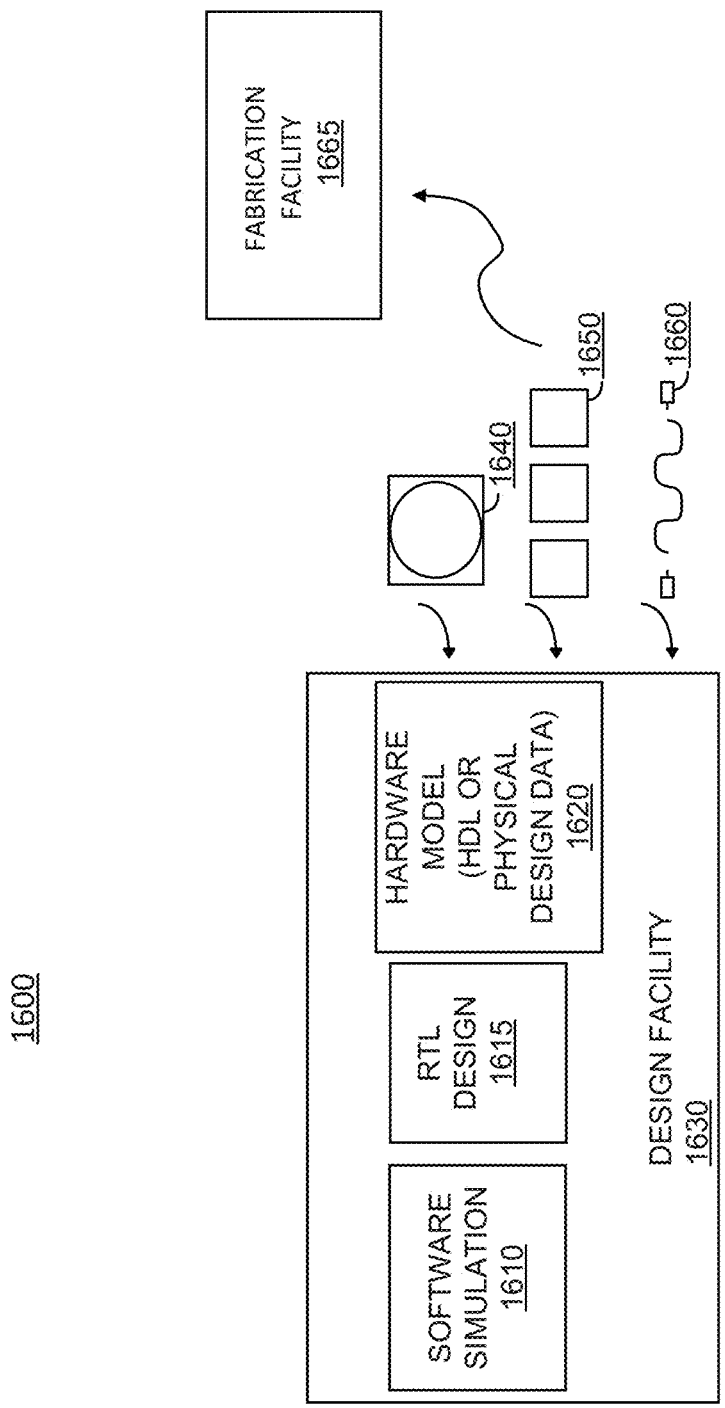
FIG. 16 is a block diagram illustrating an IP core development system used to manufacture an integrated circuit to perform operations according to an embodiment.

FIG. 16 is a block diagram illustrating an IP core development system 1600 that may be used to manufacture an integrated circuit to perform operations according to an embodiment. The IP core development system 1600 may be used to generate modular, re-usable designs that can be incorporated into a larger design or used to construct an entire integrated circuit (e.g., an SoC integrated circuit). A design facility 1630 can generate a software simulation 1610 of an IP core design in a high level programming language (e.g., C/C++). The software simulation 1610 can be used to design, test, and verify the behavior of the IP core. A register transfer level (RTL) design can then be created or synthesized from the simulation model. The RTL design 1615 is an abstraction of the behavior of the integrated circuit that models the flow of digital signals between hardware registers, including the associated logic performed using the modeled digital signals. In addition to an RTL design 1615, lower-level designs at the logic level or transistor level may also be created, designed, or synthesized. Thus, the particular details of the initial design and simulation may vary.

The RTL design 1615 or equivalent may be further synthesized by the design facility into a hardware model 1620, which may be in a hardware description language (HDL), or some other representation of physical design data. The HDL may be further simulated or tested to verify the IP core design. The IP core design can be stored for delivery to a third party fabrication facility 1665 using non-volatile memory 1640 (e.g., hard disk, flash memory, or any non-volatile storage medium). Alternately, the IP core design may be transmitted (e.g., via the Internet) over a wired connection 1650 or wireless connection 1660. The fabrication facility 1665 may then fabricate an integrated circuit that is based at least in part on the IP core design. The fabricated integrated circuit can be configured to perform operations in accordance with at least one embodiment described herein.

Figure 17:
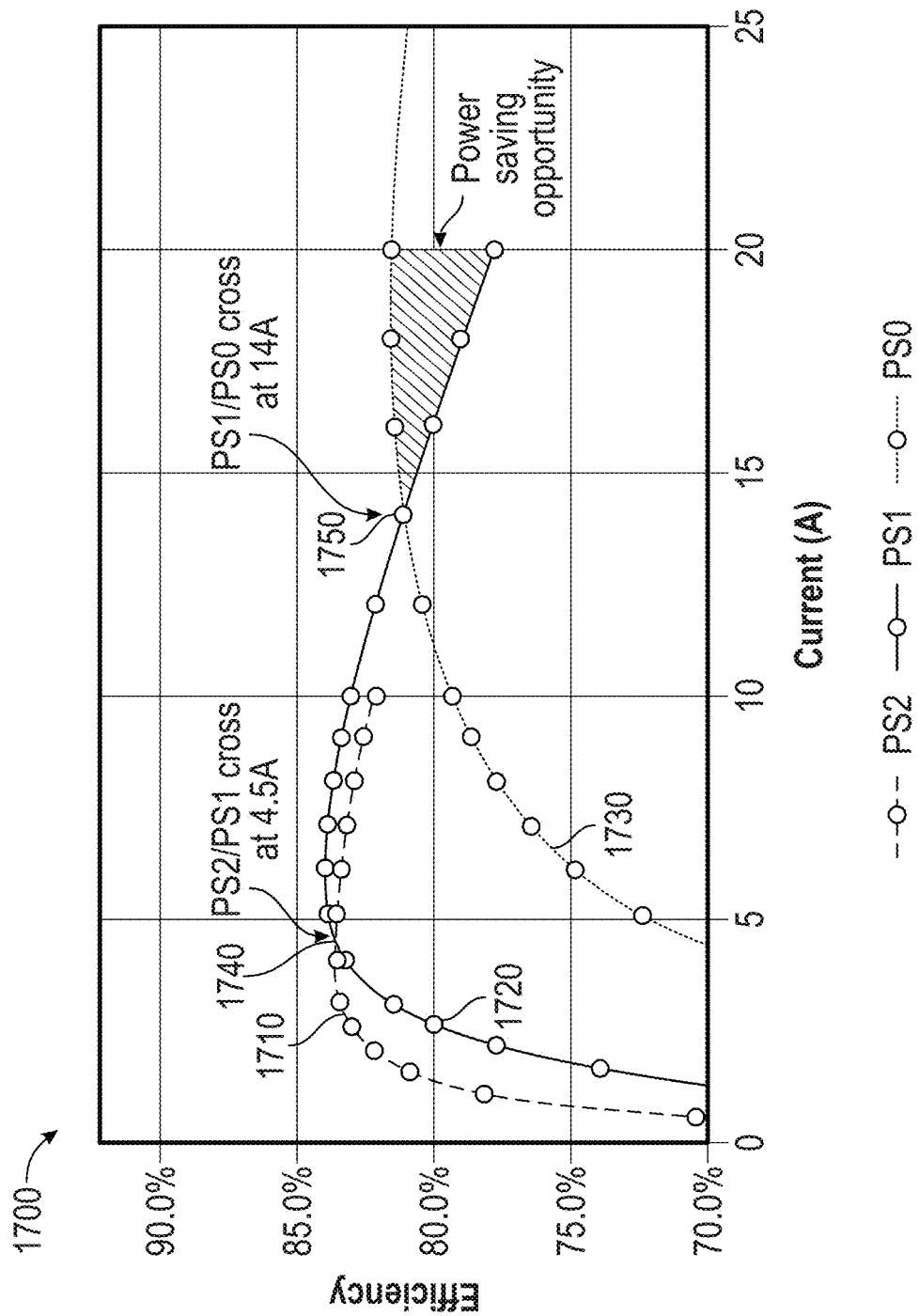
FIG. 17 is a graphical illustration of a set of efficiency curves for a voltage regulator.

Referring now to FIG. 17, shown is a graphical illustration of a set of efficiency curves for a voltage regulator. As shown in FIG. 17, illustration 1700 graphs efficiency versus output current for a voltage regulator in accordance with an embodiment. As shown, three example efficiency curves 1710, 1720, 1730 are provided. Each efficiency curve is for a given power state configuration for a voltage regulator. With these curves, a plurality of crossover points 1740 and 1750 are presented. Each of these crossover points is an inflection point at which efficiency is better served by moving from one curve to another, namely from one power state configuration to another.

Since each of these efficiency curves is for a given power state configuration of a voltage regulator, power saving opportunities may be realized by dynamically reconfiguring the voltage regulator from one power state configuration to another power state configuration at a different current consumption levels.

More specifically as illustrated in FIG. 17, efficiency curve 1710 is for a voltage regulator in operation at a first power state configuration, namely a PS2 configuration state. In turn, efficiency curve 1720 is for a voltage regulator in operation at a second power state configuration, namely a PS1 configuration state. Finally, efficiency curve 1730 is for a voltage regulator in operation at a third power state configuration, namely a PS0 configuration state.

As seen, voltage regulator efficiency may increase when operating at a current level of approximately 4.5 Amperes (A) or greater by switching voltage regulator configuration from PS2 to PS1, as indicated at crossover point 1740. Similarly, voltage regulator efficiency also may increase when operating at a current level of approximately 14 A or greater by switching voltage regulator configuration from PS1 to PS0, as indicated at crossover point 1750.

From these three efficiency curves of FIG. 17, a power state (PS) profile may be determined. This PS profile provides multiple cutoff thresholds to indicate operating points at which a voltage regulator may be dynamically reconfigured from one power state configuration to another power state configuration, to improve voltage regulator efficiency. In one embodiment, each threshold may correspond to given current level at which a given power state configuration for a voltage regulator is to take effect.

Understand that the three efficiency curves shown in FIG. 17 may be for a given operating voltage level. However because a processor may be dynamically controlled to operate at a wide variety of operating voltages, understand that the efficiency curves of FIG. 17 may not be optimal in all operating conditions. That is, since the efficiency curves vary with different voltages, crossover points may change also. Thus embodiments provide a set of efficiency curves each for one or more of multiple different operating voltages (or voltage ranges). With multiple efficiency curves, power savings may be maximized over a wide range of operating conditions. With embodiments herein, a plurality of PS profiles may be provided and used to dynamically control one or more voltage regulators to operate according to cutoff thresholds specified in a given PS profile based at least in part on a workload currently being executed on a processor. In this way, with optimized cutoff thresholds, power consumption also may be optimized. And as described herein, a selection of one of these multiple PS profiles may be based at least in part on detected workload conditions.

Figure 18:
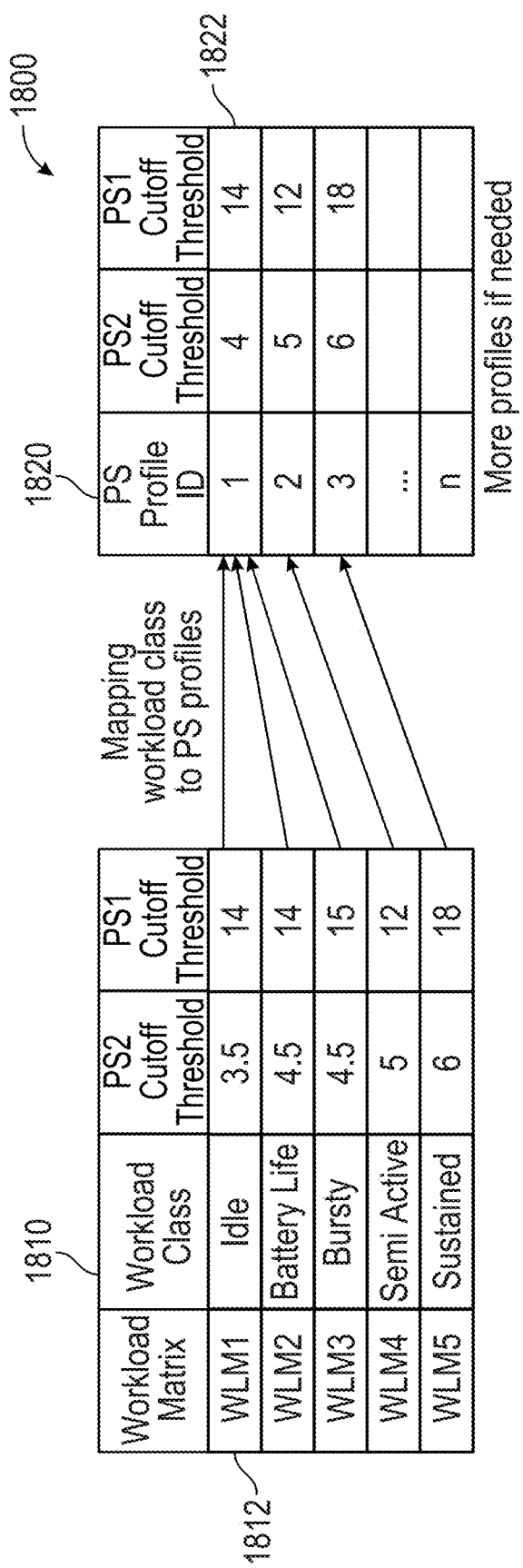
FIG. 18 is an illustration of a workload class-to-power state profile mapping in accordance with one embodiment.

Referring now to FIG. 18, shown is an illustration of a workload class-to-power state profile mapping in accordance with one embodiment. As shown in FIG. 18, different workload classes can be identified and a mapping may be performed between particular workload classes and one of multiple PS profiles. Specifically as shown in FIG. 18, a mapping architecture 1800 is used to map a workload table 1810 to a PS table 1820. In an embodiment, workload table 1810 can be determined based on testing data obtained from a plurality of workloads executed on a platform. And the multiple PS profiles 1822 in PS table 1820 may be determined based on analysis of the efficiency curves determined based on the testing data. In an embodiment, PS table 1820 may be programmed by BIOS configuration and can be stored in power management configuration registers. For example, there may be 5 PS profile slots, each having PS1/PS2 cutoff threshold fields with allocated register space for BIOS to fill out. For example, each PS profile 1822 may be associated with a type of workload for which better power or performance may be realized using the profile. In turn, this testing data is analyzed and used to set the cutoff thresholds specified in the PS profile. In the high level view of FIG. 18, each PS profile includes only two cutoff thresholds to represent two power state reconfigurations between three different power states (PS2-to-PS1 and PS1-to-PS0). Of course more or fewer cutoff thresholds may be present in other examples.

As shown in FIG. 18, workload table 1810 includes a plurality of entries 1812, each for a given workload matrix or workload classification type. As seen, each workload classification type may have multiple associated cutoff thresholds, e.g., determined as a result of a large amount of testing data. Note that certain workload types, namely idle, battery life and bursty workloads, have relatively similar cutoff thresholds. Specifically, these workloads have cutoff thresholds that are within approximately 1 A of each other. Accordingly, these 3 different workload classifications may be mapped to a single PS profile having a first identifier, PS profile ID 1. As shown PS profile 1 provides for a PS2 cutoff threshold of 4 A and a PS1 cutoff threshold of 14 A. Thus this PS profile associates with multiple workload types.

Other workload types, namely semi-active and sustained workloads, instead map to exclusive PS profiles, respectively. Specifically as shown, a semi-active workload maps to a PS profile having a second identifier (PS profile ID 2) and a sustained workload maps to a PS profile having a third identifier (PS profile ID 3). In turn PS profile 2 provides for a PS2 cutoff threshold of 5 A and a PS1 cutoff threshold of 12 A. Finally PS profile 3 provides for a PS2 cutoff threshold of 6 A and a PS1 cutoff threshold of 18 A.

While shown with these particular mappings, understand that embodiments are not limited in this regard. In other cases there may be additional PS profiles and further there may be different mappings between workload classes and PS profiles. In addition, there may be additional workload classes. For example, there may be different types of workload classes base on different conditions. Furthermore, in some cases it may be possible for a single workload type to map to multiple PS profiles, depending at least in part on operating conditions such as whether a platform is operating on AC power or DC power, operating voltage or other such operating conditions.

Figure 19:
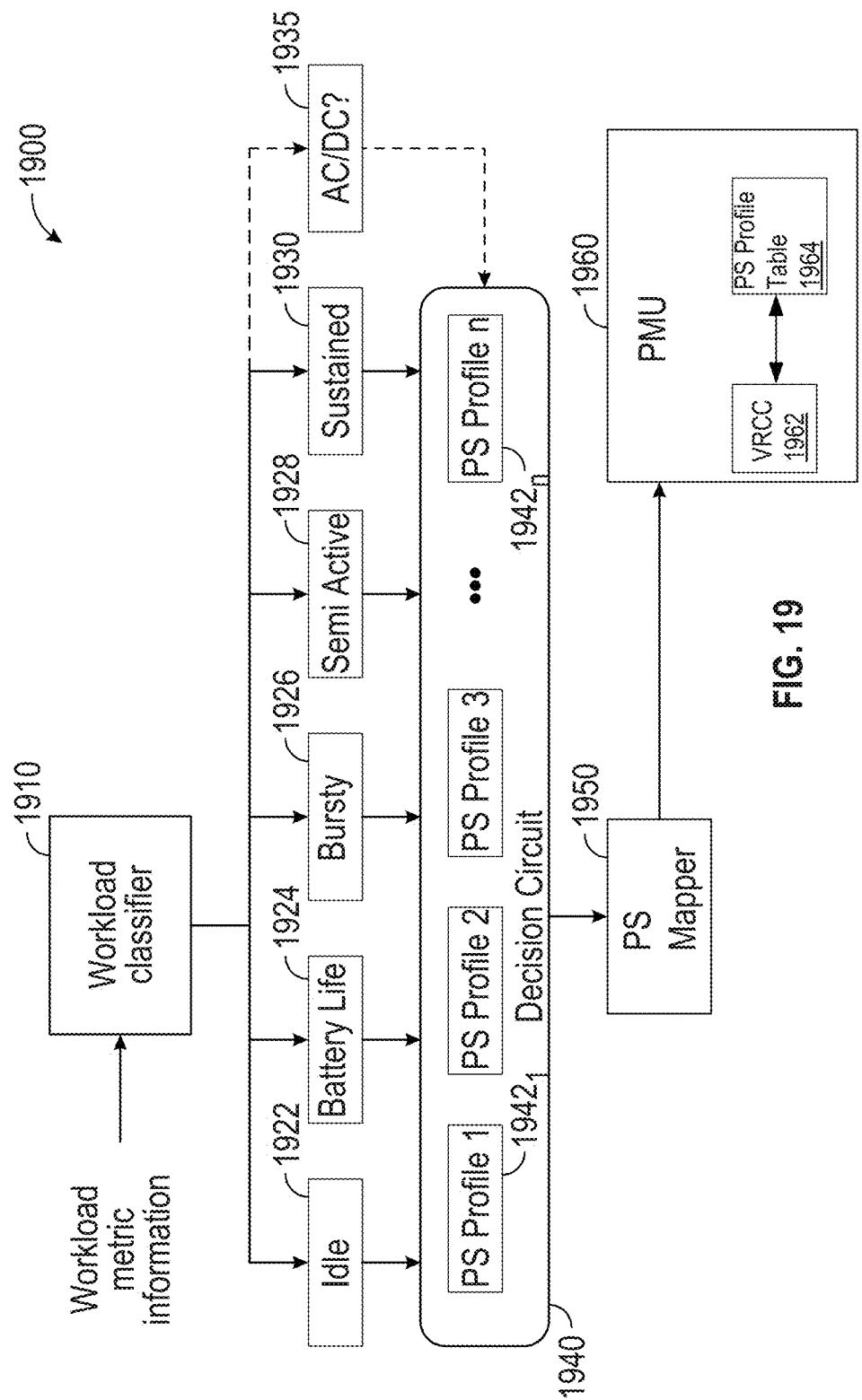
FIG. 19 is a block diagram of a computing platform to perform dynamic power state profile determinations in accordance with an embodiment.

Referring now to FIG. 19, shown is a block diagram of a computing platform to perform dynamic PS profile determinations in accordance with an embodiment. As shown in FIG. 19, computing platform 1900 may be any type of computing platform, e.g., ranging from a small portable device such as a smartphone, laptop so forth, to a larger client system, an enterprise system or so forth. Computing platform 1900 includes a workload classifier 1910 that is configured to receive incoming workload metric information. Such workload metric information may include information that describes characteristics of the workload. As examples, such information may include voltage, frequency, activity metrics (such as CPU residency information, duration/cycle of power level and on/off state), power, software events, among others.

Note that workload classifier 1910 may execute on the same processor on which the workload is running, in some cases. In other cases, platform 1900 may include multiple processors, where workload classifier 1910 may execute on a different processor than the workloads that it evaluates. In an embodiment, workload classifier 1910 may be implemented as a machine learning classifier. In one particular embodiment, workload classifier 1910 may be an Intel® Dynamic Platform Thermal Framework (DPTF) or an Intel® Dynamic Tuning Technology (DTT) component.

Based at least in part on this received workload metric information, workload classifier 1910 may classify the running workload to be one of a plurality of predetermined workload class types. In the embodiment illustrated in FIG. 19, these workload classification types include an idle workload 1922, a battery life workload 1924, a bursty workload 1926, a semi-active workload 1928, and a sustained workload 1930.

Idle workload 1922 may be selected where power consumption is consistently low for long periods of time. Battery life workload 1924 may be selected where power is relatively low, but a processor is actively performing a task such as video playback for a long period of time. The battery life and idle workloads may be similar, in that the power consumed for these workloads over a time period is relatively low without any bursty behavior.

Sustained workload 1930 may be selected for a power level that is relatively high with few or no periods of idleness. As examples, a peak power level budget (e.g., PL2) can be exhausted and an average power level budget (e.g., PL1) will be exhausted eventually, with this workload execution.

Bursty workload 1926 may consume a relatively constant average amount of power; however, bursts of activity interrupt periods of relative idleness. The bursts are short enough and spaced such that the power limit PL1 budget is typically not exhausted. The bursts may occur with periods of idleness in between the bursts.

Semi-active workload 1928 may be selected where a relatively constant average amount of power is consumed, but bursts of activity interrupt periods of relative idleness. The bursts are long enough that some bursts may exhaust the power limit PL2 budget. For example, bursts may be irregular, but are long enough that the PL2 budget may be exhausted. Of course other workload classifications are possible in other embodiments.

In certain embodiments, workload classifier 1910 also may optionally determine whether platform 1900 is in execution on battery power or wall power, as determined at block 1935. In other cases, another system component may identify whether an AC or DC power source is active based on other information.

As seen, a given workload classification may be provided to a decision circuit 1940. In embodiments herein, decision circuit 1940 may include control circuitry and a PS table such as PS table 1820 of FIG. 18. Based at least in part on the workload classification (and optionally power source indication), decision circuit 1940 may determine an appropriate one of a plurality of PS profiles for use. In some embodiments, decision circuit 1940 may also consider user preference information regarding user preference between performance and power consumption to determine an appropriate power state profile. As illustrated, decision circuit 1940 may output a selected profile, e.g., by way of a profile identifier, to a PS mapper 1950. In one embodiment, PS mapper 1950 may be implemented within an Intel® DPTF or DTT component. Of course embodiments are not limited in this regard.

In turn, PS mapper 1950 may provide an indication of an update to a PS profile to a power management unit (PMU) 1960. In one embodiment, PS mapper 1950 is coupled to PMU 1960 via a mailbox interface. Note that in other cases, decision circuit 1940 may communicate a selected PS profile directly to PMU 1960.

PMU 1960 includes a voltage regulator control circuit 1962 which may receive the indication of PS profile update and take appropriate action. To this end, voltage regulator control circuit 1962 may access a corresponding PS profile, e.g., stored in a PS profile table 1964 or another configuration storage of PMU 1960 or in another location. Then based on a determination of a current consumption level of the processor, VRCC 1962 may cause an update to a power state configuration of a voltage regulator (not shown in FIG. 19). As a result, the voltage regulator may be controlled to dynamically operate at a highest efficiency point depending on a workload being executed and/or operating conditions of a processor.

Figure 20:
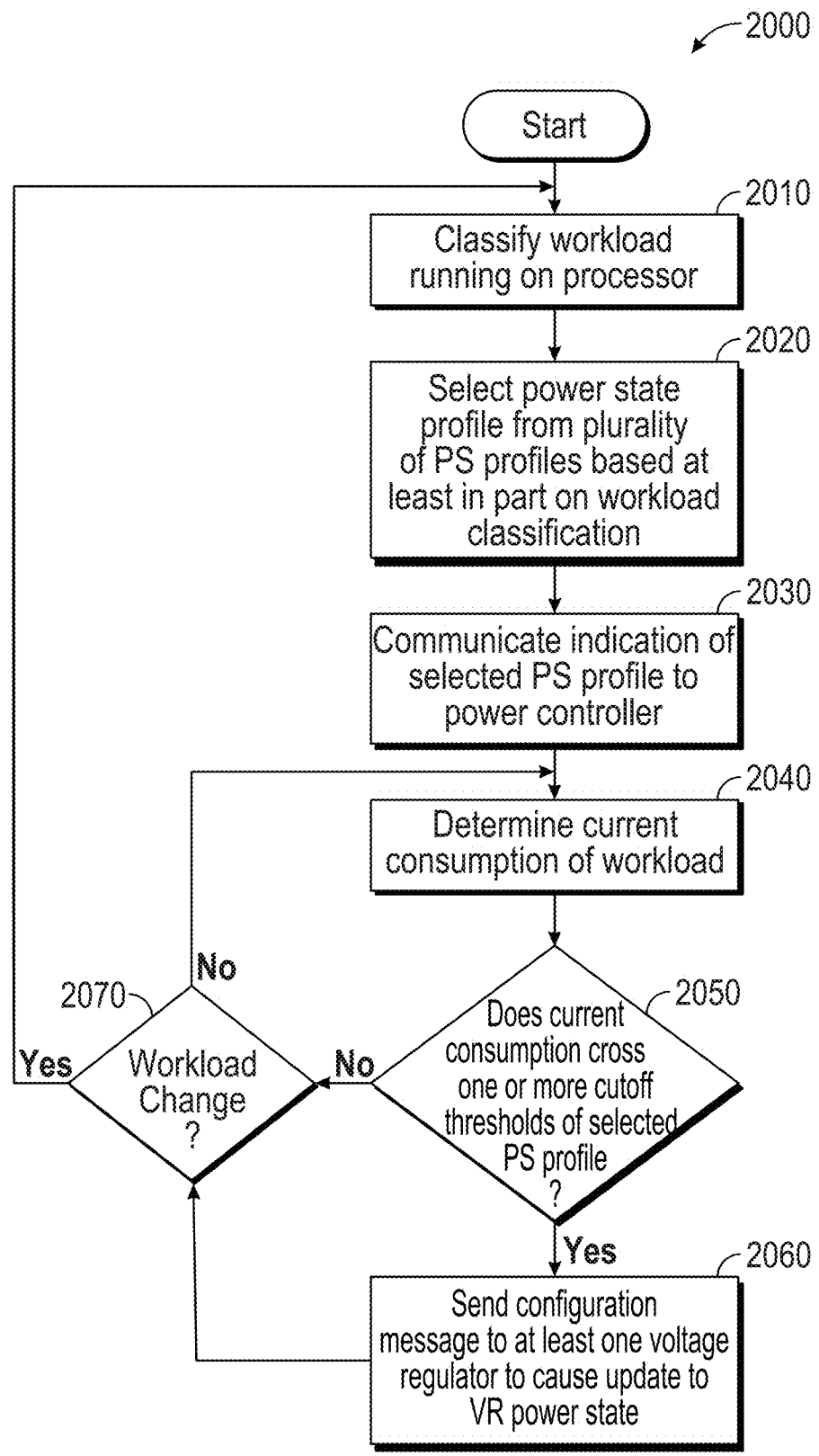
FIG. 20 is a flow diagram of a method in accordance with an embodiment of the present invention.

Referring now to FIG. 20, shown is a flow diagram of a method in accordance with an embodiment of the present invention. As shown in FIG. 20, method 2000 is a method for dynamically controlling a voltage regulator configuration using workload classification as described herein. In an embodiment, method 2000 may be performed by various components of a platform, including a workload classifier and a power controller. As such, method 2000 may be performed by hardware circuitry, firmware, software and/or combinations thereof.

As illustrated, method 2000 begins by classifying a workload running on a processor (block 2010). For example, a workload classifier may identify a given workload, e.g., using pattern matching or so forth. Understand that different workload classifications may be present in particular embodiments. At a high level, at least two workload classifications may be provided, e.g., a first workload classification type to indicate a more performance-driven workload and a second workload classification type to indicate a more power-sensitive workload. In more typical embodiments, more than two different workload classification types are available. In any event, control passes from block 2010 to block 2020, where a power state profile is selected from a plurality of such power state profiles based at least in part on workload classification. In an embodiment, a decision circuit may select the power state profile. To this end, the decision circuit may receive an indication of the classified workload from the workload classifier and, e.g., using a workload identifier for this classified workload, access a given power state profile within a power state profile table. In other embodiments, understand that this selection of a power state profile may occur in other locations. For example, in some cases the workload classifier may communicate the workload classification type directly to the power controller, which in turn accesses a power state profile table (e.g., included in a configuration storage of the power controller) to identify the selected power state profile.

Continuing with FIG. 20, in the embodiment shown an indication of the selected power state profile may be communicated to the power controller (block 2030). For example, a power state profile identifier for the selected power state profile may be communicated. From this information the power controller may access the particular power state profile from within its own configuration storage, to identify appropriate cutoff thresholds for this selected power state profile. For example, the power controller may obtain these cutoff thresholds and store them in one or more configuration registers for use in performing voltage regulator configuration changes.

At this point, the power controller may determine current consumption of the workload, e.g., within the processor (block 2040). Such current consumption may be determined based at least in part on frequency of operation, number of cores, and other system parameters, and worst case current scenarios. Note also that this current consumption may be determined before a change in a power state and/or a performance state of the processor (e.g., a C-state and/or P-state change). Next it is determined at diamond 2050 whether the current consumption crosses (e.g., exceeds or falls below) one or more of the cutoff thresholds of the selected power state profile. If so, control passes to block 2060. At block 2060, the power controller may send a configuration message to at least one voltage regulator to cause it to update its power state. For example, assume that the determined current consumption exceeds 15 A, where 15 A is a cutoff threshold of the selected power state profile at which a power state is to transition from PS1 to PS0. Continuing with this example, the power controller sends a configuration message to cause the voltage regulator to update its power state to PS0. Or vice versa, if current consumption is below 15 A, the power controller may send a configuration message to cause the voltage regulator to update its power state to PS1 (if in PS0). Note it may be assumed by default that a power state of PS1 is selected, e.g., on startup and maintained until an appropriate power state change is determined either to reduce the power state to a lower power state when lighter processor activity is occurring, or to increase to a higher power state when a high current consumption workload is in execution.

Finally with reference to FIG. 20, after sending this configuration message, control passes to diamond 2070, to determine whether there has been a workload change. If not, control passes back to block 2040 for further determination of current consumption. Note that diamond 2070 also is entered directly from diamond 2050 if the determined current consumption does not exceed or drop below any of the cutoff thresholds. If it is determined that there is a change in workload, control passes back to block 2010, discussed above. Note that this determination of workload change may be as a result of an indication of a new workload being executed within the processor. Additional configuration changes for a processor may occur based on workload classification. For example one or more power levels (e.g., power budgets) may be dynamically updated based on workload classification. In turn, the power controller may cause one or more cores or other processing units to operate at different voltage and/or frequency combinations as a result of the updated power levels. Understand while shown at this high level in the embodiment of FIG. 20, many variations and alternatives are possible.

Figure 21:
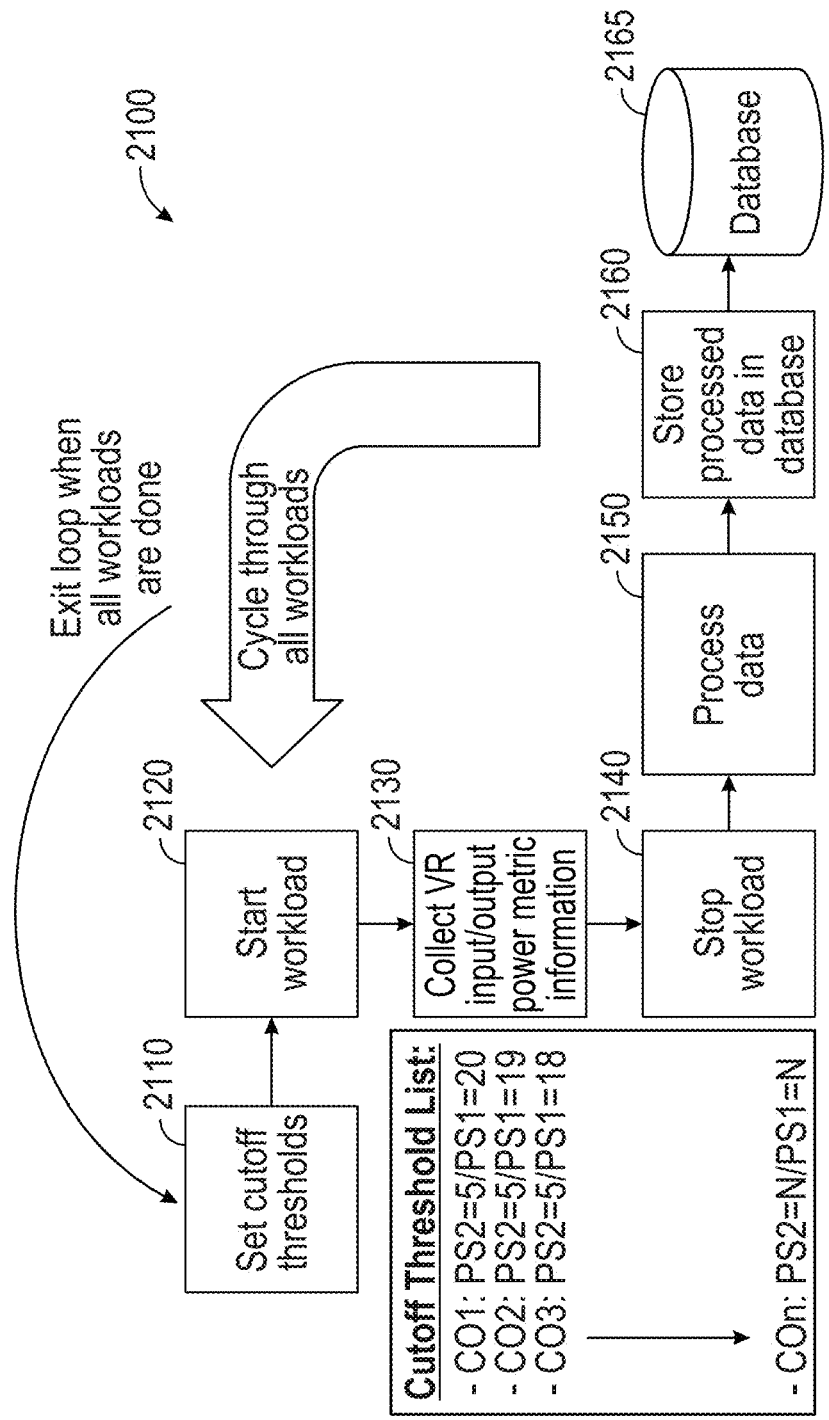
FIG. 21 is a flow diagram of a method in accordance with another embodiment of the present invention.

Referring now to FIG. 21, shown is a flow diagram of a method in accordance with another embodiment of the present invention. As shown in FIG. 21, method 2100 is a method for tuning power state profiles for a voltage regulator using a machine learning environment. As shown in FIG. 21, method 2100 may be performed using a machine learning environment for a given platform. As illustrated, method 2100 begins by setting cutoff thresholds (block 2110). These cutoff thresholds may be a set of current consumption levels at which a voltage regulator is to be dynamically reconfigured from one power state to another.

When a set of thresholds is identified, control passes to block 2120 where a workload is selected to begin execution. This workload may be one of many different types of workloads that may be executed to obtain testing data. As illustrated, during execution of this workload, voltage regulator power metric information may be collected. More specifically as shown at block 2130, VR input/output power information may be collected. Although embodiments are not limited in this regard, as examples this power metric information may include performance scores of benchmark, frequency (P-state) residency, CPU on/off (C-state) residency, among other such information. Thereafter the workload in execution may be stopped (block 2140). Next at block 2150 the data may be processed. In an embodiment, the data may be processed to determine VR loss information, a performance score and so forth.

At block 2160 this information, namely the processed data, may be stored in a database 2165. Control next passes back to block 2120 where a next workload may be executed using the same set of cutoff thresholds. When all workloads to be tested have been executed with this set of thresholds, control passes back to block 2110, where another set of cutoff thresholds can be identified and used to again execute the multiple workloads, beginning at block 2120.

As such, when all workloads have cycled through all sets of thresholds, database 2165 includes a large set of processed data regarding power loss, performance scores and so forth. Then machine learning may be performed using this processed data to identify PS profiles for use in the platform. Such PS profiles may be populated, e.g., into BIOS or otherwise provided to a system, such that they may be stored in a configuration storage accessible to a power controller. Then during normal operation the power controller may access an appropriate PS profile, e.g., based at least in part on workload classification type, and provide appropriate configuration messages to a voltage regulator based on current consumption levels, to cause dynamic reconfigurations to a power state of the regulator. Understand while shown at this high level in the embodiment of FIG. 21, many variations and alternatives are possible. For example, this machine learning technique may be used dynamically at certain evaluation intervals (e.g., several weeks or months) and while the platform is connected to an AC power source and a user is not using the platform to dynamically update associations of workloads types to power state profiles. In addition, this machine learning environment may be used to dynamically select new and different sets of cutoff thresholds and then based on testing over multiple workloads to identify new power state profiles. In turn, a power state profile table may be dynamically updated with such new power state profiles.

Embodiments thus recognize that optimal power state cutoff threshold combinations vary with different workloads. With embodiments, multiple power state profiles may be provided for a particular platform in which cutoff thresholds can be scaled for different workloads. In combination with workload classification, an optimal power state profile may be selected based on a workload classification type in execution. In turn, the selected power state profile may be used to identify operating points (e.g., current consumption levels) at which a dynamic reconfiguration of a power state of one or more voltage regulators may occur to improve power delivery efficiency.

The following examples pertain to further embodiments.

In one example, a processor includes: at least one core to execute a workload; a voltage regulator to provide an operating voltage to the at least one core; and a power controller coupled to the voltage regulator. The power controller may control the voltage regulator to provide the operating voltage, and may include a voltage regulator control circuit to select one of a plurality of power state profiles based at least in part on a classification of the workload, and to cause an update to a power state of the voltage regulator according to the selected power state profile.

In an example, the power controller further is to select the one of the plurality of power state profiles based on an active power source for a platform including the processor.

In an example, the power controller further is to select the one of the plurality of power state profiles based on a user preference between performance and power consumption.

In an example, the power controller is to map the classification of the workload to the selected one of the plurality of power state profiles.

In an example, the processor further comprises a configuration storage to store the plurality of power state profiles, where each of the plurality of power state profiles has a power state identifier and includes a plurality of cutoff thresholds.

In an example, the processor is to receive the plurality of power state profiles via a firmware and store the plurality of power state profiles in the configuration storage.

In an example, each of the plurality of power state profiles comprises a heterogeneous set of cutoff thresholds.

In an example, the power controller is to determine a current consumption level of the processor and send a power state update command to the voltage regulator to cause the update to the power state of the voltage regulator, when the current consumption level exceeds a first cutoff threshold of the plurality of cutoff thresholds of the selected one of the plurality of power state profiles.

In an example, the voltage regulator comprises a configuration circuit to reconfigure the voltage regulator from a first power state to a second power state based on the power state update command, where the voltage regulator is to operate in a discontinuous conduction mode in the first power state and to operate in a continuous conduction mode in the second power state.

In an example, the processor further comprises a workload classifier to classify the workload using machine learning.

In an example, the workload classifier is to predict a next workload to be executed on the at least one core and send a classification update to the power controller to cause the power controller to select a second one of the plurality of power state profiles based at least in part on the classification update, and to cause another update to the power state of the voltage regulator according to the selected second one of the plurality of power state profiles.

In another example, a method comprises: identifying a plurality of sets of cutoff thresholds at which an integrated voltage regulator of a processor of a platform is to change power state; for each of the plurality of sets of cutoff thresholds, executing a plurality of workloads on the processor and obtaining voltage regulator metric information for the plurality of workloads; and based at least in part on the voltage regulator metric information, generating a plurality of power state profiles for the integrated voltage regulator, each of the plurality of power state profiles associated with at least one workload type.

In an example, the method further comprises providing the plurality of power state profiles to the processor via a firmware.

In an example, the method further comprises: selecting a first set of cutoff thresholds for a first power state profile and associating the first power state profile with a first workload type; and selecting a second set of cutoff thresholds for a second power state profile and associating the second power state profile with a plurality of workload types.

In an example, the method further comprises selecting the first set of cutoff thresholds for the first workload type based on the voltage regulator metric information comprising voltage regulator efficiency information.

In an example, the method further comprises executing a first workload using the plurality of sets of cutoff thresholds to find an optimal power state profile to optimize power delivery efficiency during the first workload execution.

In an example, the method further comprises selecting the plurality of workloads using machine learning, where the plurality of workloads comprises frequent workloads for a user of the platform.

In another example, a computer readable medium including instructions is to perform the method of any of the above examples.

In a further example, a computer readable medium including data is to be used by at least one machine to fabricate at least one integrated circuit to perform the method of any one of the above examples.

In a still further example, an apparatus comprises means for performing the method of any one of the above examples.

In yet another example, a system comprises a multicore processor and a system memory coupled to the multicore processor. The multicore processor may include: a first domain including one or more cores; a second domain including at least one graphics processor; at least one integrated voltage regulator to provide a regulated voltage to at least the first domain, where the at least one integrated voltage regulator comprises a configuration circuit to dynamically reconfigure the at least one integrated voltage regulator from a first power state to a second power state; and a power controller coupled to the at least one integrated voltage regulator. In turn, the power controller may include a voltage regulator control circuit to select a power state profile from a plurality of power state profiles based at least in part on a current consumption level and classification of a workload in execution on the multicore processor, and use the selected power state profile to cause the at least one integrated voltage regulator to be dynamically reconfigured from the first power state to the second power state.

In an example, the system further comprises a workload classifier to classify the workload using machine learning and to send an indication of the workload to the power controller, where the power controller is to access a table having a plurality of entries, each entry associated with a power state profile, and select the power state profile using the workload indication, the selected power state profile comprising a set of cutoff thresholds at which a power state transition of the at least one integrated voltage regulator is to occur.

In an example, the system memory comprises a database to store processed data comprising voltage regulator metric information for a plurality of workloads, where the plurality of power state profiles are derived at least in part using the processed data.

Understand that various combinations of the above examples are possible.

Note that the terms "circuit" and "circuitry" are used interchangeably herein. As used herein, these terms and the term "logic" are used to refer to alone or in any combination, analog circuitry, digital circuitry, hard wired circuitry, programmable circuitry, processor circuitry, microcontroller circuitry, hardware logic circuitry, state machine circuitry and/or any other type of physical hardware component. Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. Still further embodiments may be implemented in a computer readable storage medium including information that, when manufactured into a SoC or other processor, is to configure the SoC or other processor to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:
1. A processor comprising:
at least one core to execute a workload;
a voltage regulator to provide an operating voltage to the at least one core;
a power controller coupled to the voltage regulator, wherein the power controller is to control the voltage regulator to provide the operating voltage, the power controller comprising a voltage regulator control circuit to select one of a plurality of power state profiles based at least in part on a classification of the workload, and to cause an update to a power state of the voltage regulator according to the selected power state profile; and
a configuration storage to store the plurality of power state profiles, wherein each of the plurality of power state profiles has a power state identifier and includes a plurality of cutoff thresholds, each of the plurality of cutoff thresholds to identify a consumption level at which an update to the power state of the voltage regulator is to occur.

2. The processor of claim 1, wherein the power controller further is to select the one of the plurality of power state profiles based on an active power source that is to provide power to a platform including the processor.

3. The processor of claim 2, wherein the power controller further is to select the one of the plurality of power state profiles based on a user preference between performance and power consumption.

4. The processor of claim 1, wherein the power controller is to map the classification of the workload to the selected one of the plurality of power state profiles.

5. The processor of claim 1, wherein the processor is to receive the plurality of power state profiles via a firmware and store the plurality of power state profiles in the configuration storage.

6. The processor of claim 1, wherein each of the plurality of power state profiles comprises a heterogeneous set of cutoff thresholds.

7. The processor of claim 1, wherein the power controller is to determine a current consumption level of the processor and send a power state update command to the voltage regulator to cause the update to the power state of the voltage regulator, when the current consumption level exceeds a first cutoff threshold of the plurality of cutoff thresholds of the selected one of the plurality of power state profiles.

8. The processor of claim 7, wherein the voltage regulator comprises a configuration circuit to update the power state of the voltage regulator from a first power state to a second power state based on the power state update command, wherein the voltage regulator is to operate in a discontinuous conduction mode in the first power state and to operate in a continuous conduction mode in the second power state.

9. The processor of claim 1, further comprising a workload classifier to classify the workload using machine learning.

10. The processor of claim 9, wherein the workload classifier is to predict a next workload to be executed on the at least one core and send a classification update to the power controller to cause the power controller to select a second one of the plurality of power state profiles based at least in part on the classification update, and to cause another update to the power state of the voltage regulator according to the selected second one of the plurality of power state profiles.

11. At least one computer readable storage medium having stored thereon instructions, which if performed by a machine cause the machine to perform a method comprising:
identifying a plurality of sets of cutoff thresholds at which an integrated voltage regulator of a processor of a platform is to change power state;
for each of the plurality of sets of cutoff thresholds, executing a plurality of workloads on the processor and obtaining voltage regulator metric information for the plurality of workloads;
based at least in part on the voltage regulator metric information, generating a plurality of power state profiles for the integrated voltage regulator, each of the plurality of power state profiles associated with at least one workload type;
selecting a first set of cutoff thresholds for a first power state profile and associating the first power state profile with a first workload type, and selecting the first set of cutoff thresholds for the first workload type based on the voltage regulator metric information comprising voltage regulator efficiency information; and
selecting a second set of cutoff thresholds for a second power state profile and associating the second power state profile with a plurality of workload types.

12. The computer readable storage medium of claim 11, wherein the method further comprises providing the plurality of power state profiles to the processor via a firmware.

13. The computer readable storage medium of claim 11, wherein the method further comprises executing a first workload using the plurality of sets of cutoff thresholds to find an optimal power state profile to optimize power delivery efficiency during the first workload execution.

14. The computer readable storage medium of claim 11, wherein the method further comprises selecting the plurality of workloads using machine learning, wherein the plurality of workloads comprises frequent workloads for a user of the platform.

15. A system comprising:
a multicore processor comprising:
a first domain including one or more cores;
a second domain including at least one graphics processor;
at least one integrated voltage regulator to provide a regulated voltage to at least the first domain, wherein the at least one integrated voltage regulator comprises a configuration circuit to dynamically update the at least one integrated voltage regulator from a first power state to a second power state;
a power controller coupled to the at least one integrated voltage regulator, wherein the power controller comprises a voltage regulator control circuit to select a power state profile from a plurality of power state profiles based at least in part on a current consumption level and classification of a workload in execution on the multicore processor, and use the selected power state profile to cause the at least one integrated voltage regulator to be dynamically updated from the first power state to the second power state; and
a configuration storage to store the plurality of power state profiles, wherein each of the plurality of power state profiles has a power state identifier and includes a plurality of cutoff thresholds, each of the plurality of cutoff thresholds to identify a consumption level at which an update to the power state of the at least one integrated voltage regulator is to occur; and
a system memory coupled to the multicore processor.

16. The system of claim 15, further comprising a workload classifier to classify the workload using machine learning and to send an indication of the workload to the power controller.

17. The system of claim 15, wherein the system memory comprises a database to store processed data comprising voltage regulator metric information for a plurality of workloads, wherein the plurality of power state profiles are derived at least in part using the processed data.

* * * * *